(12) United States Patent
Nakao

(10) Patent No.: US 8,295,400 B2
(45) Date of Patent: Oct. 23, 2012

(54) RECEIVING METHOD AND APPARATUS, AND COMMUNICATION SYSTEM USING THE SAME

(75) Inventor: Seigo Nakao, Gifu (JP)

(73) Assignee: Sanyo Electric Co., Ltd, Moriguchi-shi (JP)

( * ) Notice: Subject to any disclaimer, the term of this patent is extended or adjusted under 35 U.S.C. 154(b) by 892 days.

(21) Appl. No.: 11/222,221

(22) Filed: Sep. 9, 2005

(65) Prior Publication Data

US 2006/0056530 A1  Mar. 16, 2006

(30) Foreign Application Priority Data

Sep. 10, 2004  (JP) ................................. 2004-263915
Oct. 5, 2004  (JP) ................................. 2004-293029

(51) Int. Cl.
    *H04L 27/00* (2006.01)
(52) U.S. Cl. ........................................................ 375/299
(58) Field of Classification Search .................. 375/299, 375/260; 370/208, 241, 481
    See application file for complete search history.

(56) References Cited

U.S. PATENT DOCUMENTS

| 6,633,753 | B1 | 10/2003 | Kido |
| 7,196,668 | B2* | 3/2007 | Lin et al. ........................ 343/702 |
| 7,233,773 | B2 | 6/2007 | Hansen et al. |
| 7,474,608 | B2* | 1/2009 | Stephens et al. ............... 370/203 |
| 2002/0147953 | A1 | 10/2002 | Catreux et al. |
| 2005/0152473 | A1* | 7/2005 | Maltsev et al. ................ 375/299 |
| 2005/0174927 | A1* | 8/2005 | Stephens et al. .............. 370/206 |
| 2005/0226142 | A1* | 10/2005 | Moorti et al. .................. 370/208 |
| 2005/0276347 | A1* | 12/2005 | Mujtaba et al. ................ 375/299 |
| 2006/0049993 | A1* | 3/2006 | Lin et al. ........................ 343/702 |
| 2006/0128309 | A1* | 6/2006 | Dateki et al. .................. 455/41.3 |
| 2006/0135072 | A1* | 6/2006 | Kasher et al. ............... 455/67.11 |
| 2006/0146943 | A1* | 7/2006 | Kasher et al. .................. 375/260 |
| 2006/0233111 | A1* | 10/2006 | Wright .......................... 370/241 |
| 2006/0234729 | A1* | 10/2006 | Murakami et al. ............. 455/462 |
| 2006/0262714 | A1* | 11/2006 | Tarokh et al. .................. 370/208 |
| 2008/0002780 | A1* | 1/2008 | Yu et al. ........................ 375/267 |

FOREIGN PATENT DOCUMENTS

EP   0 984 595 A1   3/2000

(Continued)

OTHER PUBLICATIONS

Sinem Coleri, et al., "Channel Estimation Techniques Based on Pilot Arrangement in OFDM Systems," IEEE Transactions on Broadcasting, Sep. 2002, pp. 223-229, vol. 48, No. 3.

(Continued)

*Primary Examiner* — Jaison Joseph
(74) *Attorney, Agent, or Firm* — DC Patent Lawyers, PLLC

(57) ABSTRACT

A radio unit receives burst signals in a target system or those in a MIMO system. A judgment unit determines if a MIMO signal having a form of channel corresponding to the target system is assigned posterior to a target LTS and a target signal. If a constellation of signal points in a position posterior to the target LTS and target signal corresponds to a constellation of signal points in a MIMO signal, the judgment unit judges that the MIMO signal is assigned in the received burst signal. If it is judged by the judgment unit that the MIMO signal was assigned, an instruction unit stops the operation of a baseband processing unit for MIMO-STS and the like assigned posterior to the MIMO signal.

2 Claims, 15 Drawing Sheets

FOREIGN PATENT DOCUMENTS

JP    2004-297172 A    10/2004
JP    2005-005758 A    1/2005

OTHER PUBLICATIONS

Written Opinion of the International Searching Authority issued in the corresponding International Application No. PCT/JP2005/016229, Dec. 20, 2005.

Otal, et al. "Philips Partial Proposal to IEEE 802.11 TGn." Aug. 14, 2004. https://mentor.ieee.org/802.11/documents.

Mujtaba, First. "TGn Sync Proposal Technical Specification." IEEE P802.11 Wireless LANs, Aug. 14, 2004, 1-135.

Extended European Search Report issued in European Patent Application No. 05781568.0, dated Oct. 26, 2011.

\* cited by examiner

FIG.4A | TARGET STS | TARGET LTS | TARGET SIGNAL | TARGET DATA |

FIG.4B | TARGET STS | TARGET LTS | TARGET SIGNAL | MIMO SIGNAL | 1ST MIMO-STS | 1ST MIMO-LTS | 1ST MIMO-DATA |
       |            |            |               |             | 2ND MIMO-STS | 2ND MIMO-LTS | 2ND MIMO-DATA |

FIG.10

RECEIVING METHOD AND APPARATUS, AND COMMUNICATION SYSTEM USING THE SAME

BACKGROUND OF THE INVENTION

1. Field of the Invention

The present invention relates to receiving technologies, and it particularly relates to a receiving method and apparatus, in which burst signals are received, and a communication system utilizing said method and apparatus.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been used in the wireless standards such as IEEE802.11a and HIPERLAN/2. The burst signals in such a wireless LAN are generally received via a time-varying channel environment and are also subject to the effect of frequency selective fading. Hence, a receiving apparatus carries out the channel estimation dynamically. In order for the receiving apparatus to carry out the channel estimation, two kinds of known signals are provided within a burst signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the amplitude and phase of signals transmitted from and received by a plurality of antennas, respectively, are so controlled as to form a directional pattern of the antenna. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a channel corresponding to each of the plurality of antennas is set. That is, channels up to the maximum number of antennas are set for the communications between the transmitting apparatus and the receiving apparatus so as to improve the data transmission rates. Moreover, combining this MIMO system with a technique such as the OFDM modulation scheme by which to transmit multicarrier signals results in a higher data transmission rate.

Suppose that a system which is both not the MIMO system and one that uses the OFDM modulation scheme (hereinafter referred to as "target system") and a system which is both the MIMO system and one that uses the OFDM modulation scheme (hereinafter simply referred to as "MIMO system") coexist in the same frequency band. In this case, if the receiving apparatus can detect the burst signals from both the "target system" and "MIMO system", necessary signals can be reliably extracted from such signals. In order to facilitate the detection of such burst signals it would be an effective way to define a common preamble signal and then place such a preamble signal in the header portion of a burst signal. On the other hand, the receiving apparatus in the target system compatible with the standard such as IEEE802.11a generally demodulates the entire burst signals and operates to discard the burst signal if the demodulated burst signal is false. Hence the receiving apparatus in the target system demodulates also the burst signal for the MIMO system. As a result, when the traffic of burst signals in the MIMO system becomes heavy, the power consumed by the receiving apparatus increases even though the receiving apparatus does not demodulate the effective burst signals.

SUMMARY OF THE INVENTION

The present invention has been made in view of the foregoing circumstances and an object thereof is to provide a receiving method and apparatus by which to suppress the increase in power consumption even if a burst signal in a communication system which is not compatible with the receiving apparatus arrives, and to provide also a communication system utilizing said receiving method and apparatus.

In order to solve the above problems, a receiving apparatus according to a preferred embodiment comprises: a first receiver that receives a known signal which is in a first communication system to be communicated by a predetermined channel and which is assigned in a channel; a judgment unit that determines whether a control signal, having a form compatible with the first communication system, which is in a second communication system to be communicated by a plurality of channels into which a channel corresponding to the first communication system is spatially divided is assigned posterior to the known signal or not; a second receiver that receives a data signal which is assigned posterior to the known signal and which is assigned in a channel corresponding to the first communication system if the judgment unit has determined that the control signal is not assigned; and an instruction unit which stops an operation of the second receiver for a data signal which is assigned posterior to the control signal and which is assigned in a plurality of channels, respectively, corresponding to the second communication system if the judgment unit has determined that the control signal is assigned.

The "form compatible with the first communication system" includes a format defined by the same number of channels as that in the first communication system and a format which is defined by the different number of channels as that in the first communication system but defined by a sequence of signals receivable by the first communication system. That is, preferred is the form receivable by a receiving apparatus in the first communication system.

According to this embodiment, the control signal in the second communication system has a format compatible with the first communication system. Thus, the receiving apparatus can detect the control signal in the second communication system. If the control signal is detected, the receiving operation will be stopped, thus suppressing the increase in power consumption.

A data signal assigned in a channel corresponding to the first communication system and the control signal may be defined in a manner such that constellations of signal points thereof differ from each other. If the constellation of signal points in a position posterior to the known signal corresponds to the constellation of signal points in the control signal, the judgment unit may determine that the control signal is assigned. In this case, the presence or absence of the constellation of a control signal can be determined.

The data signal and the control signal assigned in a channel corresponding to the first communication system may be so defined as to use a plurality of carriers; of a plurality of carriers used for the data signal and a plurality of carriers used for the control signal, pilot signals may be allotted to mutually corresponding carriers thereof; signal points in the pilot signals in the data signal and signal points in the pilot signals in the control signal may be so defined as to have the same signal point constellation and have different phases; and if a phase of signal points in the pilot signals positioned posterior to the known signal corresponds to a phase of signal points in the pilot signals in the control signal, the judgment unit may determine that the control signal is assigned.

"Mutually corresponding carriers" correspond to the same carries among the plurality of carriers and these correspond to carriers of the same frequency. Even if they are not the carriers that correspond to the same frequency, it suffices if the correspondence between them is recognized. In this case, the presence or absence of the control signal can be determined by the difference in phase among the pilot signals The data signal and the control signal assigned in a channel corresponding to the first communication system may be so defined as to use a plurality of carriers; of a plurality of carriers used for the data signal and a plurality of carriers used for the control signal, pilot signals may be allotted to mutually corresponding carriers thereof, and signal points in carriers other than pilot signals in the data signal and signal points in carriers other than pilot signals in the control signal may be so defined as to have different signal point constellations; and if signal point constellation in carriers other than pilot signals positioned posterior to the known signal corresponds to signal point constellation in carriers other than pilot signals in the control signal, the judgment unit may determine that the control signal is assigned. In this case, the presence or absence of the control signal can be determined by the difference in signal point constellation among the carriers other than the pilot signals.

The data signal assigned in a channel corresponding to the first communication system and the control signal may be so defined as to use a plurality of carriers; of a plurality of carriers used for the data signal and a plurality of carriers used for the control signal, pilot signals may be allotted to mutually corresponding carriers thereof, and signal points in pilot signals in the data signal and signal points in pilot signals in the control signal may be so defined as to have the same signal point constellation and have different phases, and signal points in carriers other than pilot signals in the data signal and signal points in carriers other than pilot signals in the control signal may be so defined as to have different signal point constellations; and if a phase of signal points in pilot signals positioned posterior to the known signal corresponds to a phase of signal points in pilot signals in the control signal and if signal point constellation in carriers other than pilot signals positioned posterior to the known signal corresponds to signal point constellation in carriers other than pilot signals in the control signal, the judgment unit may determine that the control signal is assigned. In this case, the presence or absence of the control signal can be determined by the use of difference in phase among the pilot signals and the difference in signal point constellation among the carriers other than the pilot signals.

The instruction unit may extract from the control signal the lengths of data signals assigned respectively in a plurality of channels corresponding to the second communication system, and stop an operation of the second receiver over a period of time corresponding to the extracted lengths of the data signals. A control signal in the first communication system may be further assigned in a position prior to the control signal in the second communication system, and the instruction unit may extract from the control signal in the first communication system the lengths of data signals assigned respectively in a plurality of channels corresponding to the second communication system, and then stop an operation of the second receiver over a period of time corresponding to the extracted lengths of the data signals. In this case, the operation is stopped based on the lengths of data signals, so that a normal receiving processing can be executed to a burst signal that arrives next.

Another preferred embodiment according to the present invention relates also to a receiving apparatus. This apparatus comprises: a first receiver which receives, from a transmitting apparatus in a first communication system to be communicated by a predetermined channel, a known signal assigned in a channel or receives, from a transmitting apparatus in a second communication system to be communicated by a plurality of channels into which a channel corresponding to the first communication system is spatially divided, a known signal, having a predetermined relation with the known signal in the first communication system, which is assigned respectively to the plurality of channels; a specifying unit which specifies a relation among a plurality of signal-wave components contained in the known signal received by the first receiver; a second receiver that receives a data signal which is assigned posterior to the known signal and which is assigned in a channel corresponding to the first communication system if the specified relation does not correspond to a relation in a known signal in the second communication system; and an instruction unit which stops an operation of the second receiver for a data signal which is assigned posterior to the known signal and which is assigned in the channel corresponding to the first communication system if the specified relation corresponds to the relation in a known signal in the second communication system.

The "relation" means a relationship or relationships among a plurality of signals such as a shift in timing and the like. Here, a plurality of signals may be defined beforehand to be another kind of signals or the identical signals. In the latter case, due to the effect of multi-path in a radio channel, the signal becomes a plurality of signals when received.

According to this embodiment, a relationship among a plurality of known signals in the second communication system is so defined as to differ from a relationship among a plurality of signal-wave components contained in a known signal received by the first communication system. Thus the receiving apparatus can detect a burst signal in the second communication system, based on the relationship among a plurality of signal-wave components contained in the received signal. If the burst signal is detected, the receiving operation is stopped, thus suppressing the increase in power consumption.

The specifying unit may derive, by a correlation processing between the received known signal and a known signal stored beforehand, a value corresponding to the relation among a plurality of signal-wave components; if the value derived by the specifying unit is less than a threshold value corresponding to the relation in the known signal in the second communication system, the second receiver may determine that the specified relation does not correspond to the relation in the known signal in the second communication system; and if the value derived by the specifying unit is greater than or equal to the threshold value corresponding to the relation in the known signal in the second communication system, the instruction unit may determine that the specified relation corresponds to the relation in the known signal in the second communication system. In this case, the burst signal in the second communication system can be detected based on the correlation processing.

Still another preferred embodiment according to the present invention relates to a receiving method. This method is characterized in that when a control signal, having a form compatible with a first communication system, which is in a second communication system to be communicated by a plurality of channels into which a channel corresponding to the first communication system is spatially divided is not assigned within a received channel, a data signal assigned in the channel corresponding to the first communication system is received, whereas when the control signal is assigned therein, an operation of receiving a data signal respectively assigned in a plurality of channels corresponding to the second communication system is stopped.

According to this embodiment, the control signal in the second communication system has a form compatible with the first communication system. Thus, a control signal in the second communication system can be detected. As a result thereof, the receiving operation is stopped when detected, thus suppressing the increase in power consumed.

Still another preferred embodiment according to the present invention relates also to a receiving method. This method comprises: receiving, from a transmitting apparatus in a first communication system to be communicated by a predetermined channel, a known signal assigned in a channel or receiving, from a transmitting apparatus in a second communication system to be communicated by a plurality of channels into which a channel corresponding to the first communication system is spatially divided, a known signal, having a predetermined relation with the known signal in the first communication system, which is assigned respectively to the plurality of channels; receiving a data signal which is assigned posterior to the known signal and which is assigned in a channel corresponding to the first communication system if a relation among a plurality of signal-wave components contained in the received known signal does not correspond to a relation in a known signal in the second communication system; and stopping a receiving operation for a data signal which is assigned posterior to the known signal and which is assigned respectively in the plurality of channels corresponding to the second communication system if the relation among a plurality of signal-wave components contained in the received known signal corresponds to the relation in a known signal in the second communication system.

According to this embodiment, the relationship among a plurality of known signals in the second communication system is so defined as to differ from the relationship among a plurality of signal-wave components contained in a known signal received by the first communication system. Thus a burst signal in the second communication system can be detected based on the relationship among a plurality of signal-wave components contained in the received signal. As a result, if the burst signal is detected, the receiving operation is stopped, thus suppressing the increase in power consumed.

Still another preferred embodiment according to the present invention relates also to a receiving method. This method comprises: receiving a known signal which is in a first communication system to be communicated by a predetermined channel and which is assigned in a channel; determining whether a control signal, having a form compatible with the first communication system, which is in a second communication system to be communicated by a plurality of channels into which a channel corresponding to the first communication system is spatially divided is assigned posterior to the known signal or not; receiving a data signal which is assigned posterior to the known signal and which is assigned in a channel corresponding to the first communication system if it has been determined in the determining that the control signal is not assigned; and stopping an operation of the second receiver for a data signal which is assigned posterior to the control signal and which is assigned in a plurality of channels, respectively, corresponding to the second communication system if it has been determined in the determining that the control signal is assigned.

A data signal and the control signal assigned in a channel corresponding to the first communication system may be defined in a manner such that constellations of signal points thereof differ from each other. If the constellation of signal points in a position posterior to the known signal corresponds to the constellation of signal points in the control signal, the determining may determine that the control signal is assigned. The receiving a known signal may be such that a known signal which is in the second communication system and which also has a predetermined relation with the known signal in the first communication system and is at the same time assigned respectively in a plurality of channels is also received, and the determining may be such that a relation among a plurality of signal-wave components is specified and whether the control signal is assigned or not is determined based on the specified relation and a relation in the known signal in the second communication system.

The determining may be such that a threshold value corresponding to the relation in the known signal in the second communication system is stored beforehand, a value corresponding to the relation among a plurality of signal-wave components is derived by carrying out processing of correlation between a received known signal and a known signal stored beforehand, and it is determined that the control signal is assigned if the derived value is greater than or equal to the threshold value. The stopping may be such that the lengths of data signals assigned respectively in a plurality of channels corresponding to the second communication system are extracted from the control signal and an operation of the receiving a data signal over a period of time corresponding to the extracted lengths of the data signals. A control signal in the first communication system may be further assigned in a position prior to the control signal in the second communication system, and the stopping may be such that the lengths of data signals assigned respectively in a plurality of channels corresponding to the second communication system are extracted from the control signal in the first communication system and then an operation of the receiving a data signal is stopped over a period of time corresponding to the extracted lengths of the data signals.

The data signal and the control signal assigned in a channel corresponding to the first communication system may be so defined as to use a plurality of carriers; of a plurality of carriers used for the data signal and a plurality of carriers used for the control signal, pilot signals may be allotted to mutually corresponding carriers thereof; signal points in the pilot signals in the data signal and signal points in the pilot signals in the control signal may be so defined as to have the same signal point constellation and have different phases; and if a phase of signal points in the pilot signals positioned posterior to the known signal corresponds to a phase of signal points in the pilot signals in the control signal, the determining may determine that the control signal is assigned.

The data signal and the control signal assigned in a channel corresponding to the first communication system may be so defined as to use a plurality of carriers; of a plurality of carriers used for the data signal and a plurality of carriers used for the control signal, pilot signals may be allotted to mutually corresponding carriers thereof, and signal points in carriers other than pilot signals in the data signal and signal points in carriers other than pilot signals in the control signal may be so defined as to have different signal point constellations; and if signal point constellation in carriers other than pilot signals positioned posterior to the known signal corresponds to signal point constellation in carriers other than pilot signals in the control signal, the determining may determine that the control signal is assigned.

The data signal and the control signal assigned in a channel corresponding to the first communication system may be so defined as to use a plurality of carriers; of a plurality of carriers used for the data signal and a plurality of carriers used for the control signal, pilot signals may be allotted to mutually corresponding carriers thereof, and signal points in pilot signals in the data signal and signal points in pilot signals in the control signal may be so defined as to have the same signal point constellation and have different phases, and signal points in carriers other than pilot signals in the data signal and signal points in carriers other than pilot signals in the control signal may be so defined as to have different signal point constellations; and if a phase of signal points in pilot signals positioned posterior to the known signal corresponds to a phase of signal points in pilot signals in the control signal and if signal point constellation in carriers other than pilot signals positioned posterior to the known signal corresponds to signal point constellation in carriers other than pilot signals in the control signal, the determining may determine that the control signal is assigned.

Still another preferred embodiment according to the present invention relates also to a receiving method. This method comprises: receiving, from a transmitting apparatus in a first communication system to be communicated by a predetermined channel, a known signal assigned in a channel or receiving, from a transmitting apparatus in a second communication system to be communicated by a plurality of channels into which a channel corresponding to the first communication system is spatially divided, a known signal, having a predetermined relation with the known signal in the first communication system, which is assigned respectively to the plurality of channels; specifying a relation among a plurality of signal-wave components contained in the known signal received by the first receiver; receiving a data signal which is assigned posterior to the known signal and which is assigned in a channel corresponding to the first communication system if the specified relation does not correspond to a relation in a known signal in the second communication system; and stopping an operation of the second receiver for a data signal which is assigned posterior to the known signal and which is assigned in the channel corresponding to the first communication system if the specified relation corresponds to the relation in a known signal in the second communication system.

The specifying may be such that a value corresponding to the relation among a plurality of signal-wave components is derived by a correlation processing between the received known signal and a known signal stored beforehand; if the value derived by the specifying unit is less than a threshold value corresponding to the relation in the known signal in the second communication system, the receiving a data signal may determine that the specified relation does not correspond to the relation in the known signal in the second communication system; and if the value derived by the specifying unit is greater than or equal to the threshold value corresponding to the relation in the known signal in the second communication system, the stopping may determine that the specified relation corresponds to the relation in the known signal in the second communication system.

Still another preferred embodiment according to the present invention relates to a communication system. This system comprises: a first transmitting apparatus that transmits a known signal, corresponding to a first communication system to be communicated by a predetermined channel, which is assigned in a channel and a data signal which is assigned posterior to the known signal; a second transmitting apparatus that transmits a known signal and control signal having each forms compatible with the first communication system and a second communication system to be communicated by a plurality of channels into which a channel corresponding to the first communication system is spatially divided, and transmits also a data signal assigned, respectively in the plurality of channels, in a position posterior to the known signal and control signal; and a receiving apparatus, corresponding to the first communication system, which receives the data signal assigned posterior to the known signal if the control signal does not exist in a position posterior to the known signal, and stops receiving for the data signal assigned respectively in the plurality of channels if the control signal exits in a position posterior to the known signal.

According to this embodiment, the control signal in the second communication system has a form compatible with the first communication system, so that the control signal in the second communication system can be detected. As a result, the receiving operation can be stopped when detected, thus suppressing the increase in power consumption.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 4A and FIG. 4B each show a structure of a burst format relative to FIG. 3.

FIG. 10 illustrates a structure of a burst format according to a second embodiment of the present invention.

DETAILED DESCRIPTION OF THE INVENTION

Figure 1:
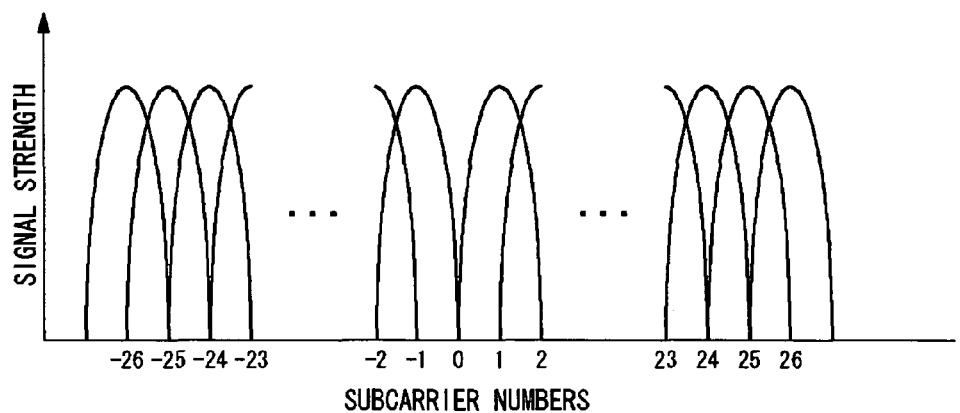
FIG. 1 illustrates a spectrum of a multicarrier signal according to a first embodiment of the present invention.

The invention will now be described based on the following embodiments which do not intend to limit the scope of the present invention but exemplify the invention. All of the features and the combinations thereof described in the embodiments are not necessarily essential to the invention.

First Embodiment

Before describing the present invention in detail, an outline of the present invention will be described first. A first embodiment of the present invention relates to a system which is both not a MIMO system and one that uses an OFDM modulation scheme (hereinafter referred to as "target system" as described before). Here, in the same frequency band as the target system, there coexists a system which is both a MIMO system and one that uses an OFDM modulation scheme (hereinafter referred to as "MIMO system" as described earlier). Here, in both the target system and the MIMO system, a common preamble is assigned in a header portion of packet signal. It is to be noted that a transmitting apparatus, equipped with a plurality of antennas, in the MIMO system transmits the preamble from one of the plurality of antennas but not from the remaining antennas.

Here, the packet signal in a target system is such that a preamble, a control signal and data are assigned in this order. In the present embodiment, on the other hand, the packet signal in a MIMO system is such that a preamble of the target system, a control signal of the target system, a control signal of the MIMO system, a preamble of the MIMO system and data of the MIMO system are assigned in this order. Here, the preamble of the target system, the control signal of the MIMO system and the control signal of the MIMO system are transmitted from a single antenna. That is, they are in the form of a burst signal.

As a result thereof, the receiving apparatus can receive these signals. On the other hand, the preamble of the MIMO system and the data of the MIMO system are transmitted from a plurality of antennas, so that they are not subject to and not a target for the receiving in the receiving apparatus.

A receiving apparatus in a target system according to the present invention receives these preambles and checks on the arrival of packet signals. The packet signals in the target system and the MIMO system are such that the preamble of the target system and the control signal of the target system are used in common therebetween. On the other hand, the data of the target system and the control signal of the MIMO system assigned posterior thereto are defined such that their signal point constellations differ. The receiving apparatus determines, from the signal point constellation, if a signal assigned posterior to the control signal of the target system is either the data of the target system or the control signal of the MIMO system. In the former case, the receiving apparatus continues the demodulation. In the latter case, the receiving apparatus stops the demodulation. It is assumed herein that a target system is a wireless LAN conforming to the IEEE802.11a standard and a MIMO system is a wireless LAN in which the IEEE802.11n standard is to be implemented.

FIG. 1 illustrates a spectrum of a multicarrier signal according to a first embodiment. Since, as described above, the target system and the MIMO system use the OFDM modulation scheme, FIG. 1 shows a spectrum of a signal in the OFDM modulation scheme compatible with the target system and the MIMO system. One of a plurality of carriers in an OFDM modulation scheme is generally called a subcarrier. Herein, however, each of the subcarriers is designated by a "subcarrier number". As illustrated in FIG. 1, the IEEE802.11a standard defines 53 subcarriers, namely, subcarrier numbers "−26" to "26". It is to be noted that the subcarrier number "0" is set to null so as to reduce the effect of a direct current component in a baseband signal. The respective subcarriers are modulated by BPSK (Binary Phase Shift Keying), QPSK (Quadrature Phase Shift Keying), 16QAM (Quadrature Amplitude Modulation) and 64QAM.

Figure 2:
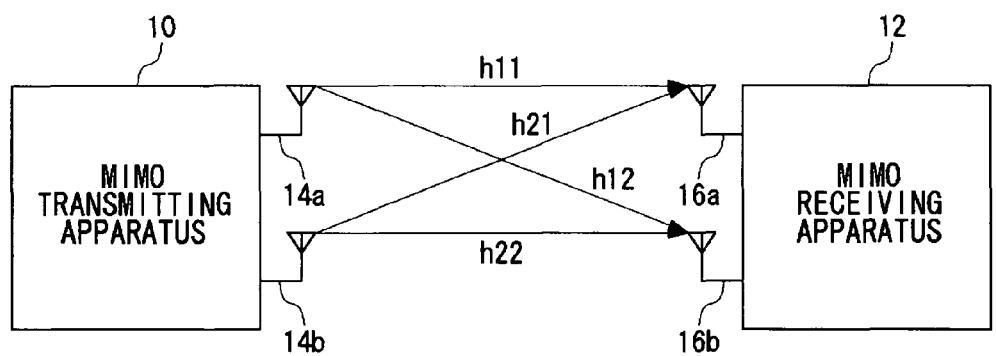
FIG. 2 illustrates a concept of a MIMO system according to the first embodiment.

FIG. 2 illustrates a concept of a MIMO system according to the first embodiment. The MIMO system includes a MIMO transmitting apparatus 10 and a MIMO receiving apparatus 12. The MIMO transmitting apparatus 10 includes a first transmitting antenna 14*a* and a second transmitting antenna 14*b*, which are generically called transmitting antennas 14, and the MIMO receiving apparatus 12 includes a first receiving antenna 16*a* and a second receiving antenna 16*b*, which are generically called receiving antennas 16. Though the MIMO receiving apparatus 12 is not directly relevant to the present embodiment, the MIMO system will be described while the MIMO receiving apparatus 12 is discussed herein as appropriate.

The MIMO transmitting apparatus 10 transmits predetermined signals and transmits different signals from the first transmitting antenna 14*a* and the second transmitting antenna 14*b*. The MIMO receiving apparatus 12 receives the signals transmitted from the first transmitting antenna 14*a* and the second transmitting antenna 14*b* by the first receiving antenna 16*a* and the second receiving antenna 16*b*. The MIMO receiving apparatus 12 separates received signals by adaptive array signal processing and demodulates the signals transmitted from the first transmitting antenna 14*a* and the second transmitting antenna 14*b* independently.

Here, if channel characteristic between the first transmitting antenna 14*a* and the first receiving antenna 16*a* is denoted by $h_{11}$, that between the first transmitting antenna 14*a* and the second receiving antenna 16*b* by $h_{12}$, that between the second transmitting antenna 14*b* and the first receiving antenna 16*a* by $h_{21}$, and that between the second transmitting antenna 14*b* and the second receiving antenna 16*b* by $h_{22}$, then the MIMO receiving apparatus 12 operates in such a manner as to activate $h_{11}$ and $h_{22}$ only by an adaptive array signal processing and demodulate the signals transmitted from the first transmitting antenna 14*a* and the second transmitting antenna 14*b* independently.

Figure 3:
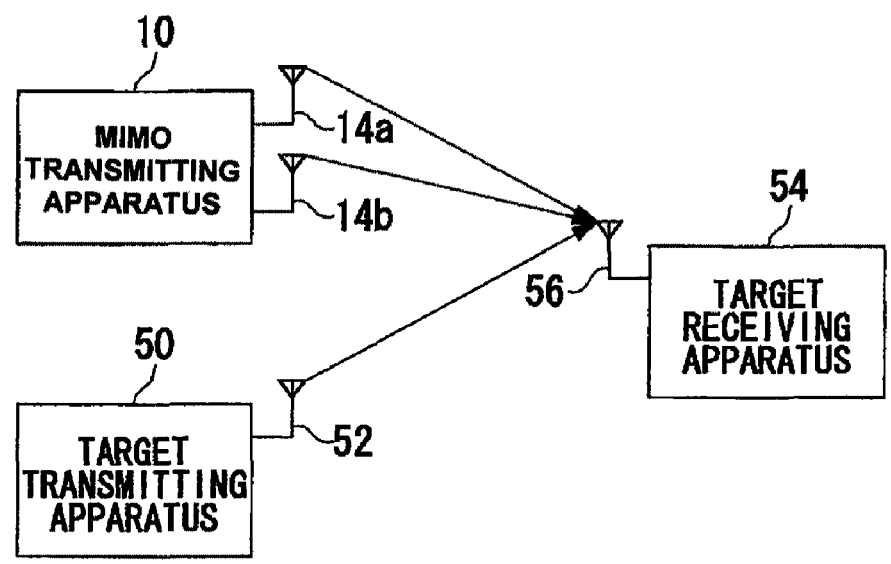
FIG. 3 illustrates a structure of a communication system according to the first embodiment.

FIG. 3 shows a structure of a communication system 100 according to the first embodiment. The communication system 100 includes a MIMO transmitting apparatus 10, a target transmitting apparatus 50 and a target receiving apparatus 54. The target transmitting apparatus 50 includes an antenna 52, and the target receiving apparatus 54 includes a receiving antenna 56. Here, the target transmitting apparatus 50 and the target receiving apparatus 54 correspond to a target system, whereas the MIMO transmitting apparatus 10 corresponds to a MIMO system.

The target transmitting apparatus 50 transmits signals from the transmitting antenna 52. Thus, the target transmitting apparatus 50 sets one channel, corresponding to the target system, for the transmitting antenna 52. That is, the target transmitting apparatus 50 transmits, in the format of burst signals, a preamble assigned in the channel and data assigned posterior to the preamble. Here, "one channel" means the number of channels set at a predetermined instant.

As described above, the MIMO transmitting apparatus 10 transmit signals independently from the first transmitting antenna 14a and the second transmitting antenna 14b, respectively. Hence, the MIMO transmitting apparatus 10 sets two channels for the first transmitting antenna 14a and the second transmitting antenna 14b, respectively. The two channels are set by spatially dividing a channel corresponding to the target system. A preamble and a control signal having the format of the target system are added to a header portion of a channel so that the target receiving apparatus 54 can receive said channel. As a result, the MIMO transmitting apparatus 10 transmits, in a burst signal format, the preamble and control signal having a channel format compatible with the target system and data, positioned posterior thereto, which are assigned to a plurality of channels, respectively. It is assumed herein that the control signal is a signal compatible with the MIMO system.

The target receiving apparatus 54, which corresponds to the target system, receives signals received from the MIMO transmitting apparatus 10, namely, two signals sent independently from the first transmitting antenna 14a and the second transmitting antenna 14b or receives signals sent from the target transmitting apparatus 50. Now, if among the received burst signals a control signal corresponding to the MIMO system does not exist in a position posterior to the preamble, the target receiving apparatus 54 judges that the received burst signals are burst signals in the target system. As a result of this, a receiving processing is performed on data assigned in the received burst signals. On the other hand, if among the received burst signals a control signal corresponding to the MIMO system exists in a position posterior to the preamble, the target receiving apparatus 54 judges that the received burst signals are those in the MIMO system. As a result of this, the target receiving apparatus 54 stops the receiving processing for the data of the MIMO system that follows the control signal corresponding to the MIMO system.

FIG. 4A and FIG. 4B each show a structure of a burst format. FIG. 4A shows the burst format of a target system and corresponds to that of a traffic channel of IEEE802.11a standard. "Target STS (Short Training Sequence)" and "Target LTS (Long Training Sequence)" shown in FIG. 4A and FIG. 4B correspond to a preamble. These are the "STS" and "LTS" defined in the IEEE802.11a standard but are shown as such in FIG. 4A and FIG. 4B to indicate that these are compatible the target system.

"Target signal" is a signal for a target system and corresponds to a control signal. "Target data" is data for the target system. The "target STS", "target LTS", "target signal", and "target data" are respectively compatible with the OFDM modulation scheme. In the IEEE802.11a standard, the size of Fourier transform is 64 (hereinafter the points of one FFT (Fast Fourier Transform) will be called "FFT point") and the FFT point number of a guard interval is 16. In the OFDM modulation scheme, the total sum of the size of Fourier transform and the FFT point number of a guard interval generally constitutes one unit. This "one unit" is called an OFDM symbol in the present embodiments. Hence, the OFDM symbol corresponds to 80 FFT points.

Here, the "target LTS" and "target signal" have each the length of "2 OFDM symbols" and the "data" has arbitrary length. The total length of "target STS" is "2 OFDM symbols". However, the signal of "16 FFT points" is repeated ten times, so that the structure thereof differs from that of the "target LTS" and the like. The preambles such as "target STS" and "target LTS" are known signals transmitted to execute the setting of AGC, timing synchronization and carrier recovery and the like in the target receiving apparatus 54. The burst signals such as the above correspond to one channel in the target system.

FIG. 4B shows a burst format of a MIMO system. It is assumed herein that the number of antennas used for transmission in the MIMO system is "2", and this corresponds to the first transmitting antenna 14a and the second transmitting antenna 14b of FIG. 3. In FIG. 4B, the upper row corresponds to a burst signal transmitted from the first transmitting antenna 14a whereas the lower row corresponds to a burst signal transmitted from the second transmitting antenna 14b. In the burst signal in the upper row of FIG. 4B, "target STS", "target LTS" and "target signal" are assigned in this order starting from the top. This arrangement is the same as the above case of the target system. "MIMO signal", which is a control signal in the MIMO system, is assigned posterior to the "target LTS". The "MIMO signal" has a channel format compatible with the target system, namely, the format of a channel that uses an antenna for transmission.

For the first transmitting antenna 14a, "first MIMO-STS", "first MIMO-LTS" and "first MIMO-data" are assigned posterior to the "MIMO" signal, as STS, LTS and data compatible with the MIMO system, respectively. On the other hand, for the second transmitting antenna 14b, "second MIMO-STS", "second MIMO-LTS" and "second MIMO-data" are placed as STS, LTS and data compatible with the MIMO system, respectively.

The above-described burst signals correspond to two spatially divided channels in the MIMO system. Signals included in the "first MIMO-STS" and the like are defined by a predetermined signal pattern. Though in FIG. 4B the burst signals, which correspond to the two transmitting antennas 14a and 14b and correspond therefore to the two channels, have been described above, they are not limited to the two channels and more than two channels may be set.

Figure 5:
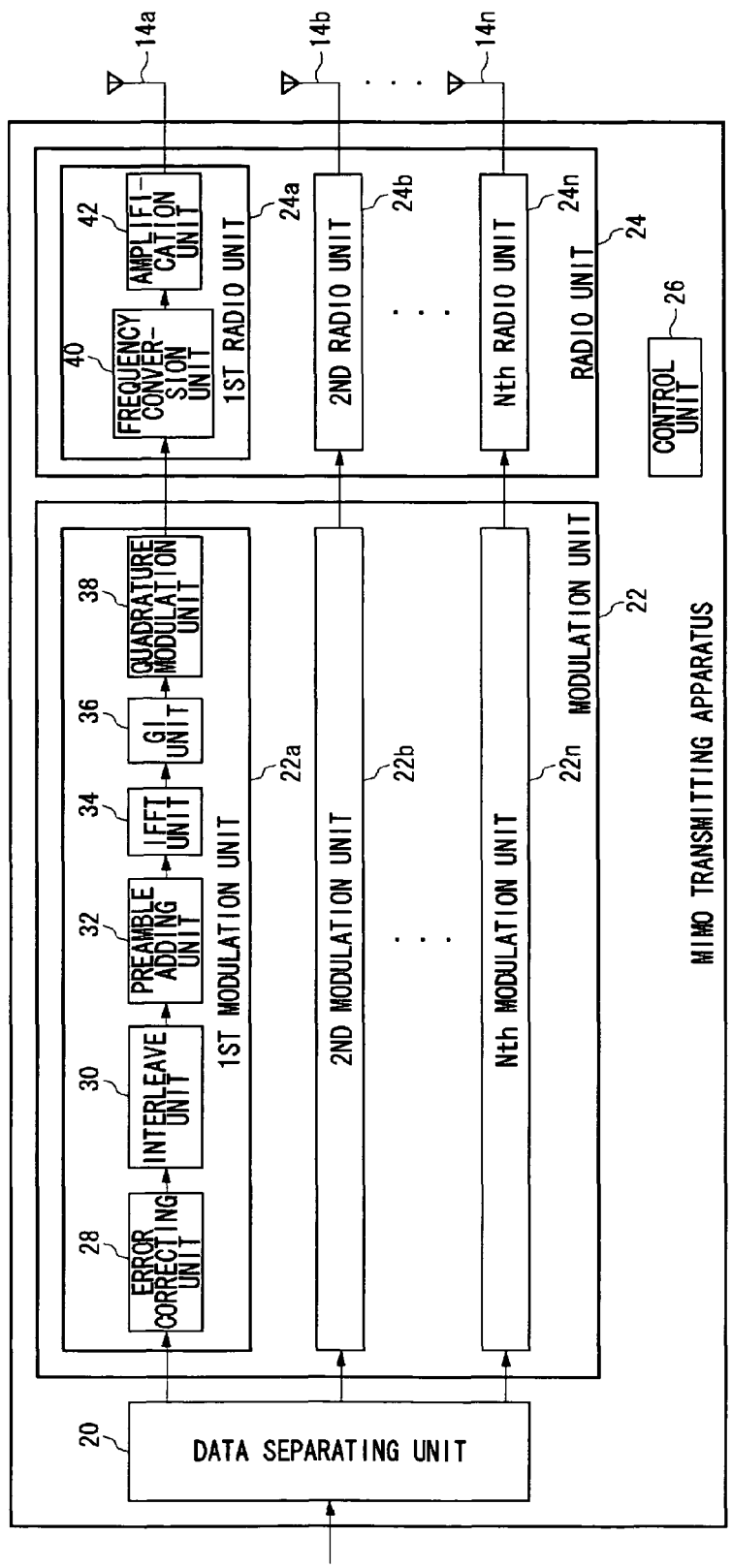
FIG. 5 illustrates a structure of a MIMO transmitting apparatus shown in FIG. 3.

FIG. 5 illustrates a structure of a MIMO transmitting apparatus 10. The MIMO transmitting apparatus 10 includes a data separating unit 20, a first modulation unit 22a, a second modulation unit 22b, . . . and an Nth modulation unit 22n, which are generically referred to as modulation units 22, a first radio unit 24a, a second radio unit 24b, . . . and an Nth radio unit 24n, which are generically referred to as radio units 24, a control unit 26, and a first transmitting antenna 14a, a second transmitting antenna 14b, . . . and an Nth transmitting antenna 14n, which are generically referred to as transmitting antennas 14. The first modulation unit 22a includes an error correcting unit 28, an interleave unit 30, a preamble adding unit 32, an IFFT unit 34, a GI unit 36 and a quadrature modulation unit 38. The first radio unit 24a includes a frequency conversion unit 40 and an amplification unit 42.

The data separating unit 20 separates data to be transmitted into the number of data equal to that of antennas. The error correcting unit 28 performs a coding for error correction on data. The coding to be employed here is a convolutional coding, and the coding rate is to be selected from prescribed values. The interleave unit 30 interleaves data after the convolutional coding. The preamble adding unit 32 adds a "target STS" and a "target LTS" to a header portion of a burst signal. The preamble adding unit 32 further adds a "first MIMO- STS" and a "first MIMO-LTS". Thus, it is assumed herein that the preamble adding unit 32 stores the "target STS", "first MIMO-STS" and the like.

The IFFT unit 34 performs IFFT (Inverse Fast Fourier Transform) in units of FFT point, thereby converting a frequency-domain signal using a plurality of subcarriers into a signal in time domain. The GI unit 36 adds a guard interval to time-domain data. The quadrature modulation unit 38 carries out quadrature modulation. The frequency conversion unit 40 performs a frequency conversion transforming a quadrature-modulated signal into a radio frequency signal. The amplification unit 42 is a power amplifier for amplifying radio frequency signals. Finally, signals having a format as shown in FIG. 4B are transmitted from a plurality of transmitting antennas 14. The control unit 26 controls the timing and other functions of the MIMO transmitting apparatus 10. It is to be noted that in the present embodiment the transmitting antennas 14 are non-directional and the MIMO transmitting apparatus 10 does not perform adaptive array signal processing. In the above-described structure, the error correcting unit 28 and the interleave unit 30 may be provided in a position anterior to the data separating unit 20. If they are positioned anterior to the data separating unit 20, the signals coded by the error correcting unit 28 and then interleaved by the interleave unit 30 are separated by the data separating unit 20. It is assumed herein that the target transmitting apparatus 50 shown in FIG. 3 is provided with the first modulation unit 22a and the first radio unit 24a.

Figure 6:
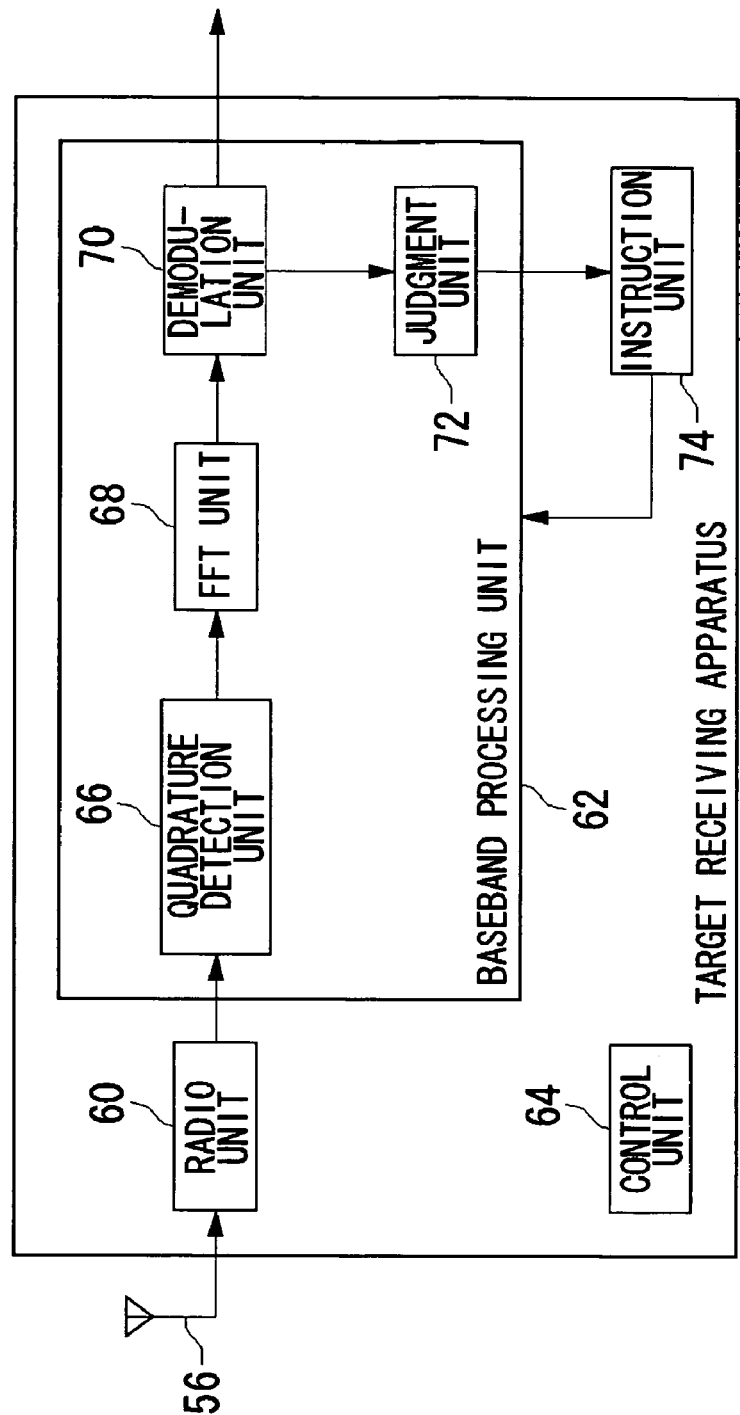
FIG. 6 illustrates a structure of a target receiving apparatus shown in FIG. 3.

FIG. 6 illustrates a structure of a target receiving apparatus 54. The target receiving apparatus 54 includes a radio unit 60, a baseband processing unit 62, a control unit 64 and an instruction unit 74. The baseband processing unit 62 includes a quadrature detection unit 66, an FFT unit 68, a demodulation unit 70 and a judgment unit 72.

The radio unit 60 carries out frequency conversion processing of received radio frequency signal into received baseband signals, and the radio unit 60 also carries out amplification processing, A-D conversion processing and the like. Since the communication system 100 assumed herein employs a wireless LAN conforming to the IEEE802.11a standard, the radio frequency is in the 5 GHz band. Here, the target transmitting apparatus 50 receives burst signals in the target system or burst signals in the MIMO system. In either case, however, it receives target STSs and target LTSs assigned in a channel.

The quadrature detection unit 66 performs a quadrature detection of the received signals which has been converted to the baseband by the radio unit 60. The quadrature-detected signal, which contains in-phase components and quadrature components, is generally represented by two signal lines. For the clarity of explanation, the signal is presented here by a single signal line, and the same will be applied hereinafter. The FFT unit 68 performs FFT on the received signals which have been quadrature-detected by the quadrature detection unit 66, and converts them from time-domain signals to frequency-domain signals. The FFT unit 68 also removes guard intervals. The demodulator 70 estimates a radio channel for both the burst signals in the target system and the burst signals in the MIMO system, based on the target LTS, and then demodulates the target signal and the like placed posterior to the target LTS, based on the estimated radio channel. The demodulator 70 also carries out the deinterleave and decoding processing. It is to be noted that although the target STS is used to set AGC (not shown) and execute the timing synchronization, any conventional technique may be used for these and therefore the explanation therefor is omitted here.

The judgment unit 72 determines if the MIMO signal having a form of a channel corresponding to the target system is assigned in a position posterior to the target LTS and the target signal. The difference in signal point constellation between a target data and a MIMO signal is used to make the above decision. That is, the target data assigned in a channel corresponding to the target system and the MIMO signal are defined beforehand in a manner such that the constellations of signal points thereof differ from each other.

Figure 7A:
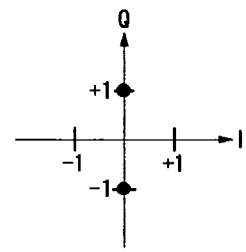
FIGS. 7A to 7D show constellations of signals contained in the burst formats shown in FIGS. 4A and 4B.
Figure 7B:
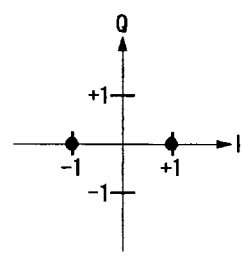

FIGS. 7A to 7D show the constellations of signals contained in burst formats shown in FIGS. 4A and 4B. FIG. 7A shows a constellation for a MIMO signal. Referring to FIG. 7A, the modulation scheme of the MIMO signal is compatible with BPSK, and the signal points thereof are defined such that the quadrature components are placed at either "+1" or "−1". That is, the constellation is defined such that the in-phase component lies at "0". FIG. 7B shows a constellation for target data. Referring to FIG. 7B, the modulation scheme of the target data is also compatible with BPSK. The signal points of the target data are defined such that the in-phase components are placed at either "+1" or "−1" and the quadrature component lies at "0".

Figure 7C:
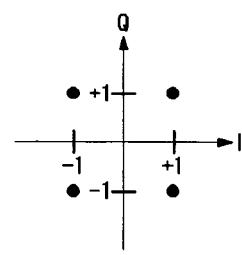
Figure 7D:
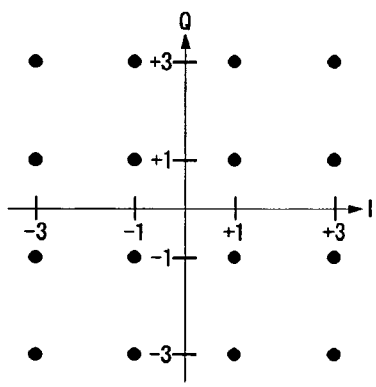

As a result, the MIMO signal and the target signal are such that their respective values of in-phase components and quadrature components for signal points differ. The MIMO signal can be discriminated from the target data and vice versa by detecting this difference. The modulation schemes are switched around, as appropriate, for the target data and QPSK, 16QAM or 64QAM may be used in addition to BPSK. FIG. 7C shows a constellation of target data when the modulation scheme is QPSK. FIG. 7D shows a constellation of target data when the modulation scheme is 16QAM. Similar to the case when the modulation scheme is BPSK, the target data can be discriminated from the MIMO signal and vice versa based on the values of in-phase components and quadrature components for the signal points.

Let us now go back to FIG. 6. As described above, if the constellation of a signal point in the position posterior to the target LTS and target signal corresponds to the constellation of a signal point in the MIMO signal, it is judged by the judgment unit 72 that a MIMO signal is assigned in the received burst signal. If it is judged by the judgment unit 72 that the MIMO signal is not assigned, the demodulation unit 70 continues to carry out demodulation, so that the demodulation unit 70 demodulates a target data signal assigned in a position posterior to the target LTS and target signal. That is, in this case, the target receiving apparatus 54 determines that the burst signal corresponding to the target system has been received and then the target receiving apparatus 54 receives in a usual manner the burst signal corresponding to the target system.

When it is judged by the judgment unit 72 that the MIMO signal has been assigned, the instruction unit 74 stops the operation of the baseband processing unit 62 for MIMO-STS, MIMO-LTS, MIMO-data and the like which are assigned in positions posterior to the MIMO signal. That is, in this case, the target receiving apparatus 54 determines that the burst signal corresponding to the MIMO system has been received and then stops receiving processing for the burst signal corresponding to the MIMO system. In so doing, the instruction unit 74 extracts the length of the first MIMO-data or the like assigned respectively in a plurality of channels corresponding to the MIMO system, and stops the operation of the baseband processing unit 62 over a period of time corresponding to the extracted length of the first MIMO-data or the like. The control unit 64 controls the timing and the like of the target receiving apparatus 54.

In terms of hardware, this structure can be realized by a CPU, a memory and other LSIs of an arbitrary computer. In terms of software, it is realized by memory-loaded programs or the like, but drawn and described herein are function blocks that are realized in cooperation with those. Thus, it is understood by those skilled in the art that these function blocks can be realized in a variety of forms such as by hardware only, software only or the combination thereof.

Figure 8:
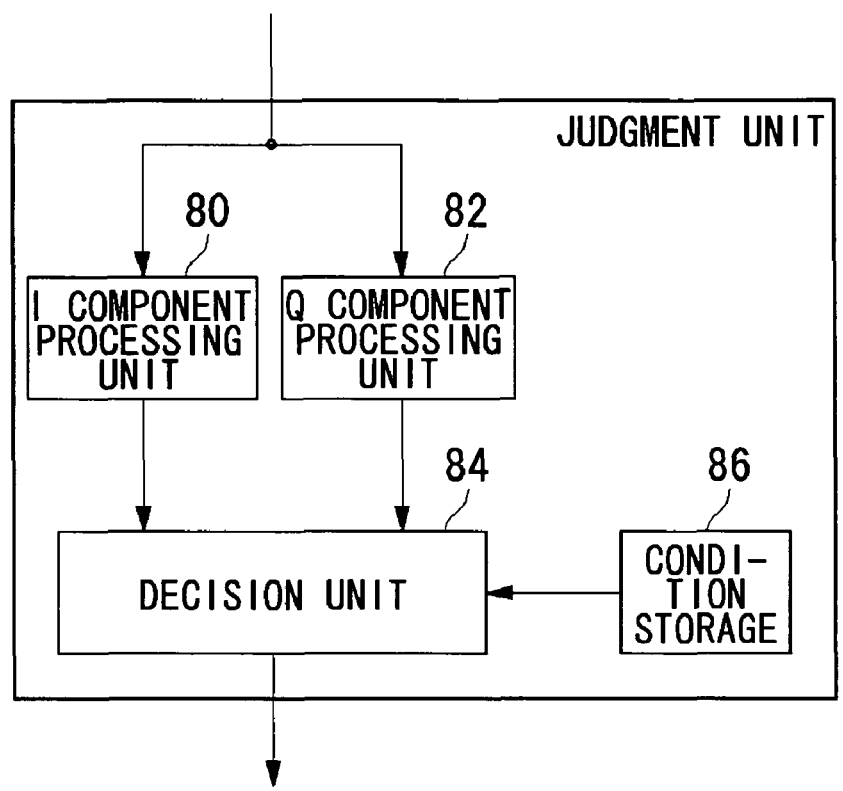
FIG. 8 illustrates a structure of a judgment unit shown in FIG. 6.

FIG. 8 illustrates a structure of a judgment unit 72. The judgment unit includes an I-component processing unit 80, a Q-component processing unit 82, a decision unit 84 and a condition storage 86.

The I-component processing unit 80 specifies the amplitude of an in-phase component of the demodulated signal. In so doing, the I-component processing unit 80 may carry out a statistical processing such as averaging. On the other hand, the Q-component processing unit 82 specifies the amplitude of a quadrature component of the demodulated signal. In so doing, the Q-component processing unit 82 may carry out the statistical processing such as averaging.

The condition storage 86 stores conditions for signal points to decide on a case when the signal points correspond to a MIMO signal. As shown in FIG. 7A, the signal points corresponding to the MIMO signal do not have the in-phase component at a transmitting side. Thus, a case where the absolute value of an in-phase component is smaller than a predetermined threshold value is defined, in the condition storage 86, to be the case corresponding to the MIMO signal. Here, the threshold value is defined to be a value where the noise is taken into account, and is set in such a manner as to be smaller than the absolute value of the signal point "+1" or "−1" of an in-phase component as in FIG. 7B. The condition storage 86 may employ the definition where the quadrature component is also used. A case where a result obtained by dividing an in-phase component value by a quadrature component value is smaller than a predetermined threshold value may be defined to be the case corresponding to the MIMO signal.

The decision unit 84 receives, from the I-component processing unit 80 and the Q-component processing unit 82, the inputs of an in-phase component value and a quadrature component value of the demodulated signal, respectively. Then, based on the conditions inputted from the condition storage 86 the decision unit 84 determines if the inputted signal is signal points corresponding to the MIMO signal. The decision unit 84 may make decision from a pair of in-phase component value and quadrature component value for the demodulated signal, or from in-phase component values and quadrature component values for the signals of a plurality of subcarriers that correspond to a single symbol. If the signal points of a received signal is determined to be those that correspond to the MIMO signal, the judgment unit 72 will output the result of decision to the instruction unit 74.

Figure 9:
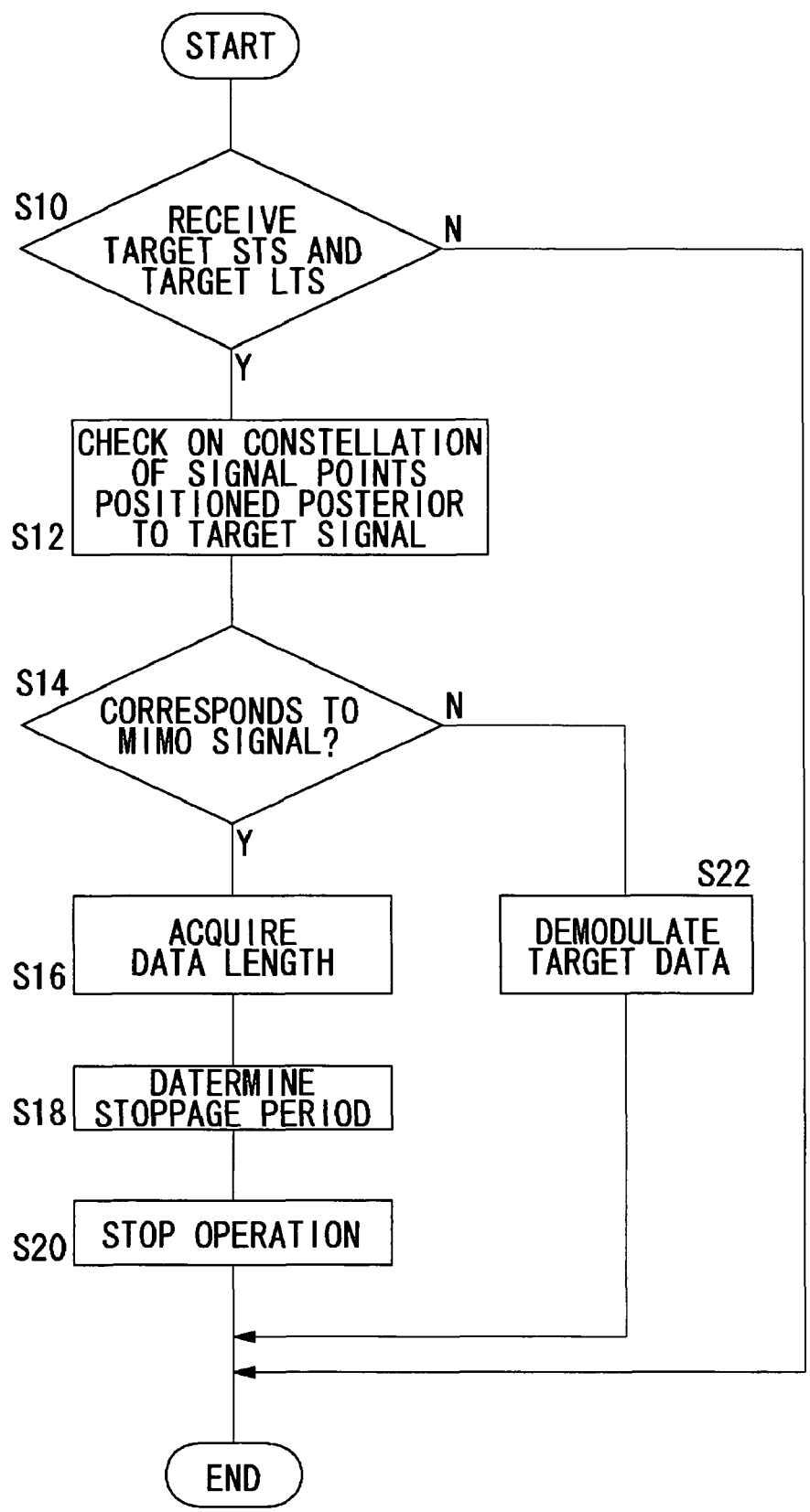
FIG. 9 is a flowchart showing a procedure of receiving operation by a target receiving apparatus shown in FIG. 6.

An operation of the target receiving apparatus 54 structured as above will now be described. FIG. 9 is a flowchart showing a procedure of receiving operation by a target receiving apparatus 54. When the target receiving apparatus 54 receives a target STS and a target LTS (Y of S10), the judgment unit 72 checks on the constellation of signal points placed posterior to the target signal (S12). If the signal point constellation corresponds to the constellation of signal points in the MIMO signal (Y of S14), the instruction unit 74 will acquire the data length from the MIMO signal (S16). Then a stoppage period is determined from the acquired data length (S18), and the instruction unit 74 stops the operation of the baseband processing unit 62 (S20). If, on the other hand, the signal point constellation does not correspond to the constellation of signal points in the MIMO signal (N of S14), the demodulation unit 70 demodulates the target data (S22). If the target receiving apparatus 54 does not receive the target STS and target LTS (N of S10), the processing is terminated.

According to the first embodiment, the MIMO signal in a MIMO system has a form of a channel corresponding to a target system, so that the target receiving apparatus can detect the MIMO signal. When the MIMO signal is detected, the receiving operation is stopped, so that the increase in power consumption can be suppressed. Furthermore, the MIMO signal is not assigned in a far-back position of a burst signal but assigned in a position halfway or well within the burst signal. Thus, even when the burst signal has not yet been received fully to cover the entire portion thereof, the target receiving apparatus can determine a communication system associated with the burst signal. Furthermore, the target receiving apparatus can receive the burst signal corresponding to a target system without ever receiving the burst signal corresponding to the MIMO system. Since the burst signal corresponding to the MIMO system is not received, the effect of the MIMO system can be minimized.

Since the increase in power consumption can be suppressed, the increase in size of battery can be prevented even if the target receiving apparatus is driven by the battery or the like. Since the increase in power consumption can be suppressed, the battery driving time can be extended even if the target receiving apparatus is powered by the battery. The target receiving apparatus can be made smaller in size. The presence or absence of the constellation of a MIMO signal can be determined by a difference in signal point constellation. Since the difference in the signal point constellation is utilized, the decision can be made at an earlier stage. Since the period during which the operation is stopped can be adjusted based on the length of MIMO-data in the MIMO system, a normal receiving processing can be performed on a burst signal arriving next.

Second Embodiment

Similar to the first embodiment, a second embodiment according to the present invention relates to a receiving apparatus which receives burst signals from a transmitting apparatus corresponding to a target system and a transmitting apparatus corresponding to a MIMO system, continues the receiving of the burst signals if the burst signal corresponds to the target system and stops the receiving of the burst signals if the burst signal corresponds to the MIMO system. However, the second embodiment differs from the first embodiment in the following two points.

The first point that differs from the first embodiment is as follows. The format of burst singles for the MIMO system differs, and the "target STSs" and the like are transmitted also from antennas, which do not transmit the "target STSs", during a period in which the "target STSs" and the like are transmitted. However, the "target STS" is not transmitted intact but it is transmitted while the timing of the signal is being shifted cyclically within the "target STS". For example, when a signal for a predetermined FFT point is shifted behind by two points, the signal assigned for the endmost two points is assigned in the beginning.

The second point is that a method, for determining if the received burst signal corresponds to the target system or MIMO system, differs in the receiving apparatus. The receiving apparatus stores beforehand the signal patterns of target STS or target LTS, and carries out processing of correlation between the signal pattern and the received burst signal. If the received burst signal corresponds to the target system, intervals among a plurality of peaks as a result of the correlation processing correspond to time difference among incoming waves in a radio channel. If, on the other hand, the burst signal corresponds to a MIMO system, the intervals among a plurality of peaks as a result of the correlation processing correspond to the difference in timing of the signals which have been shifted beforehand. If the difference in timing of the signals is defined to be greater than the time difference among a plurality of incoming waves in the radio channel, whether the received burst signal corresponds to a target system or MIMO system can be determined from the result of correlation processing.

Figure 10:
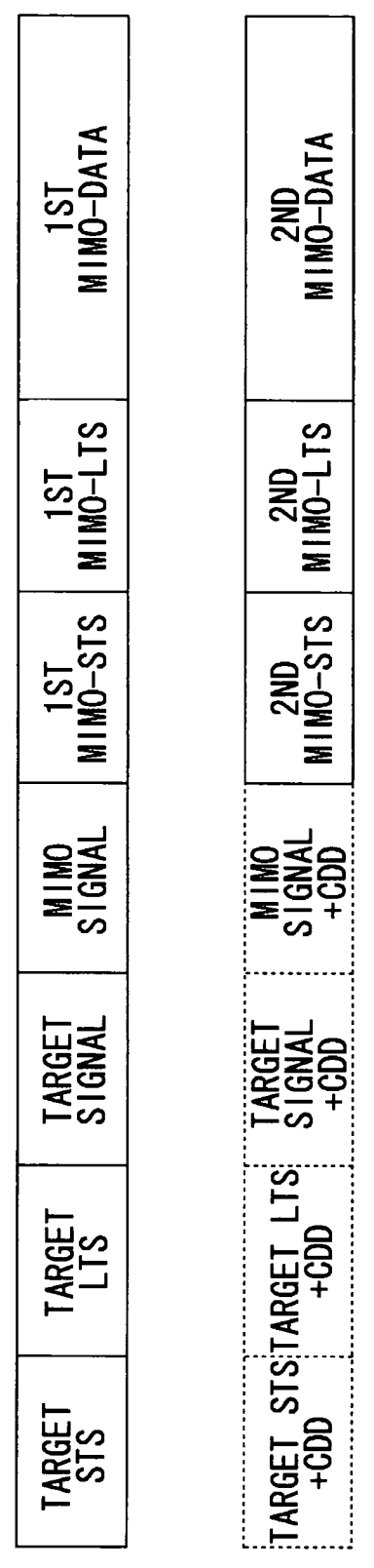

FIG. 10 illustrates a structure of a burst format according to a second embodiment of the present invention. FIG. 10 shows a burst format of a MIMO system. Since the burst format of a target system is the same as that shown in FIG. 4A, the repeated explanation thereof is omitted. Similar to FIG. 4B, the number of antennas used for transmission in the MIMO system is "2" in FIG. 10. A burst signal transmitted from the first transmitting antenna 14a is shown in the upper row of FIG. 10. A burst signal transmitted from the second transmitting antenna 14b is shown in the lower row of FIG. 10. Since the burst signal shown in the upper row of FIG. 10 is the same as the burst signal shown in the upper row of FIG. 4B, the description thereof is omitted. Of the burst signal shown in the lower row of FIG. 10, "second MIMO-STS", "second MIMO-LTS" and "second MIMO-data" are the same as those shown in the lower row of FIG. 4B.

"Target STS+CDD", "target LTS+CDD", "target signal+ CDD" and "MIMO signal+CDD" are so assigned in the burst signal transmitted from the second transmitting antenna 14b as to respectively correspond to "target STS", "target LTS", "target signal" and "MIMO signal" transmitted from the first transmitting antenna 14a. Here, "target STS+CDD" is equivalent to a case where the pattern of signal contained therewithin is the same as the pattern of signals contained in the "target STS" but the positions of the signals assigned differ. Here, the "target STS" is constituted by 160 FFT points.

For example, the signal at the FFT point of the beginning of "target STS" is in such a relation as to be assigned at the eighth FFT point of "target STS+CDD". Furthermore, the signals at the endmost eight FFT points of "target STS+CDD" are in such a relation as to be assigned to the eight FFT points from the beginning of "target STS+CDD". In this manner, the signals are so assigned that the timings of signals are shifted. The relationship in which the timing is shifted in such a case as in "target STS" and "target STS+CDD" will be hereinafter simply referred to as "relation".

In the IEEE801.11a standard, an interval between FFT points is defined to be 50 ns. Here, a shift amount of signal timing is 8 FFT points. As a result, the timing error between "target STS" and "target STS+CDD" is defined to be 400 ns. The same also applies to "target LTS+CDD", "target signal+ CDD" and "MIMO signal+CDD". That is, "target STS+ CDD" and the like in the MIMO system has a predetermined relation with "target STS" and the like in the target system.

Figure 11:
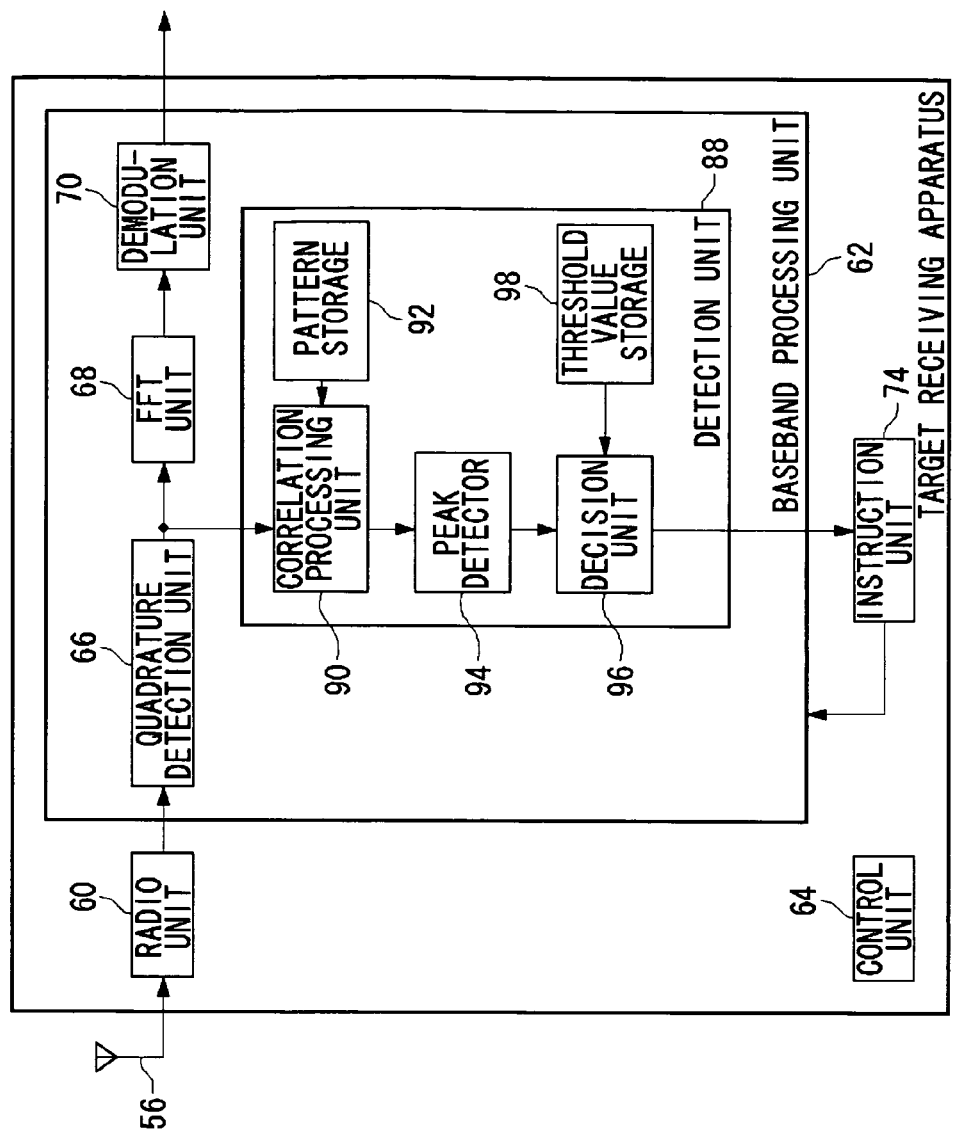
FIG. 11 illustrates a structure of a target receiving apparatus according to the second embodiment.

FIG. 11 illustrates a structure of a target receiving apparatus 54 according to the second embodiment. The target receiving apparatus 54 includes a receiving antenna 56, a radio unit 60, a baseband processing unit 62, a control unit 64 and an instruction unit 74. The baseband processing unit 62 includes a quadrature detection unit 66, an FFT unit 68, a demodulation unit 70 and a detection unit 88. The detection unit 88 includes a correlation processing unit 90, a pattern storage 92, a peak detector 94, a decision unit 96 and a threshold value storage 98. Of these components, the description of those executing the same operations as the target receiving apparatus 54 of FIG. 6 is omitted.

The radio unit 60 receives the target STSs or target LTSs assigned to a channel, from a target transmitting apparatus 50 in a target system. The radio unit 60 further receives, from a MIMO transmitting apparatus in a MIMO system, the target STSs+CDDs and target LTSs+CDDs, having a predetermined relation with the target STS and target LTS in the target system, which are assigned respectively to a plurality of channels. The target transmitting apparatus 50 and the MIMO transmitting apparatus 10 are those as shown in FIG. 3.

The pattern storage 92 stores the patterns of target STSs and target LTSs which are known signals. That is, the target STSs are expressed in the time domain and the pattern storage 92 stores the signals corresponding to 16 FFT points among them, whereas the target LTSs are expressed in the time domain and the pattern storage 92 stores the signals corresponding to 64 FFT points among them. Between the target STSs and the target LTSs, the pattern storage may store either one of the signal patterns. In such a case, a processing that uses either one of the target STS or the target LTS is carried out in the correlation processing unit 90, peak detector 94 and decision unit 96, respectively, which will be described later.

The correlation processing unit 90 performs correlation processing on the burst signal, which has been subjected to quadrature detection by the quadrature detection unit 66, and the target STS and target LTS stored in the pattern storage 92. The correlation processing unit 90 has a structure of a matched filter, and holds, as tap coefficients of a filter, the target STSs and target LTSs stored in the pattern storage 92. The correlation processing unit 90 inputs the quadrature-detected burst signals to the matched filter. As a result of the above processing, a result of correlation processing is obtained as correlation values with respect to time. If the relation between the inputted burst signals and the tap coefficient values becomes closer, the correlation value will become larger. In this manner, the correlation processing unit 90 uses the received target STSs and/or received LTSs and the target STSs and/or target LTSs stored beforehand so as to derive relations among a plurality of signal components contained in the received target STSs and/or target LTSs as the correlation values.

The peak detector 94 detects at least two peaks of the correlation values from the result of correlation processing by the correlation processing unit 90. For example, the peak detector 94 detects at least two peaks in the area of two OFDM symbols corresponding to a target STS. Here, if the inputted burst signal is the burst signal in the target system, said burst signal uses a channel. Thus, in the result of correlation processing, a peak appears at timing when a delayed wave in a radio channel exists. In a radio channel assumed in the IEEE802.11a standard, it is assumed that a delayed wave arrives after the delay of about some ten nanoseconds from the preceding wave. As described above, the aforementioned "relation" is also caused by the radio channel.

If, on the other hand, the inputted burst signal is a burst signal in the MIMO signal, a plurality of burst signals assigned to a plurality of channels are received in a combined manner. When the target STS assigned to a burst signal is being received as in FIG. 10, the target STS+CDD is also received. As described earlier, the target STS is in a relation to the target STS+CDD such that the signal timing is shifted. For example, if the shift amount of the signal timing is 8 FFT points, two peaks are detected in the positions away from about 8 FFT point apart. Since 8 FFT points are equivalent to 400 ns here, the effect of the delayed wave on the aforementioned radio channel is equivalent to as small as an error only.

The threshold value storage 98 holds threshold values with which the at least two peaks detected by the peak detector 94 are to be compared. In the above example, the threshold value is set to 300 nsec. In this manner, the threshold values are defined based on a value corresponding to a relation in a target STS and/or target LTS in a MIMO system.

The decision unit 96 compares the thus detected at least two peaks, namely, the relation in the inputted burst signal, with a threshold value, and decides if the inputted burst signal corresponds to the target system or MIMO system. That is, if the detected at least two peaks are less than the threshold value, it is determined that the relation among a plurality of signal-wave components in the inputted burst signal does not correspond to the relation in the target STS and/or target LTS in the MIMO system. Thus, in such a case, it is determined that the received burst signal corresponds to a target system. In this case, the demodulation unit 70 demodulates the target data which is assigned in a position posterior to the target LTS and target signal and is assigned in a channel corresponding to the target system.

If, on the other hand, the detected at least two peaks are greater than or equal to the threshold value, the decision unit 96 determines that the relation among a plurality of signal-wave components in the inputted burst signal corresponds to the relation in the target STS and/or target LTS in the MIMO system. Thus, in such a case, it is determined that the received burst signal corresponds to the MIMO system. In this case, the instruction unit 74 stops the operation of the baseband processing unit 62 for the first MIMO data and second MIMO data which are assigned in positions posterior to the target STS and target LTS and are assigned respectively in a plurality of channels corresponding to the MIMO system.

Figure 12:
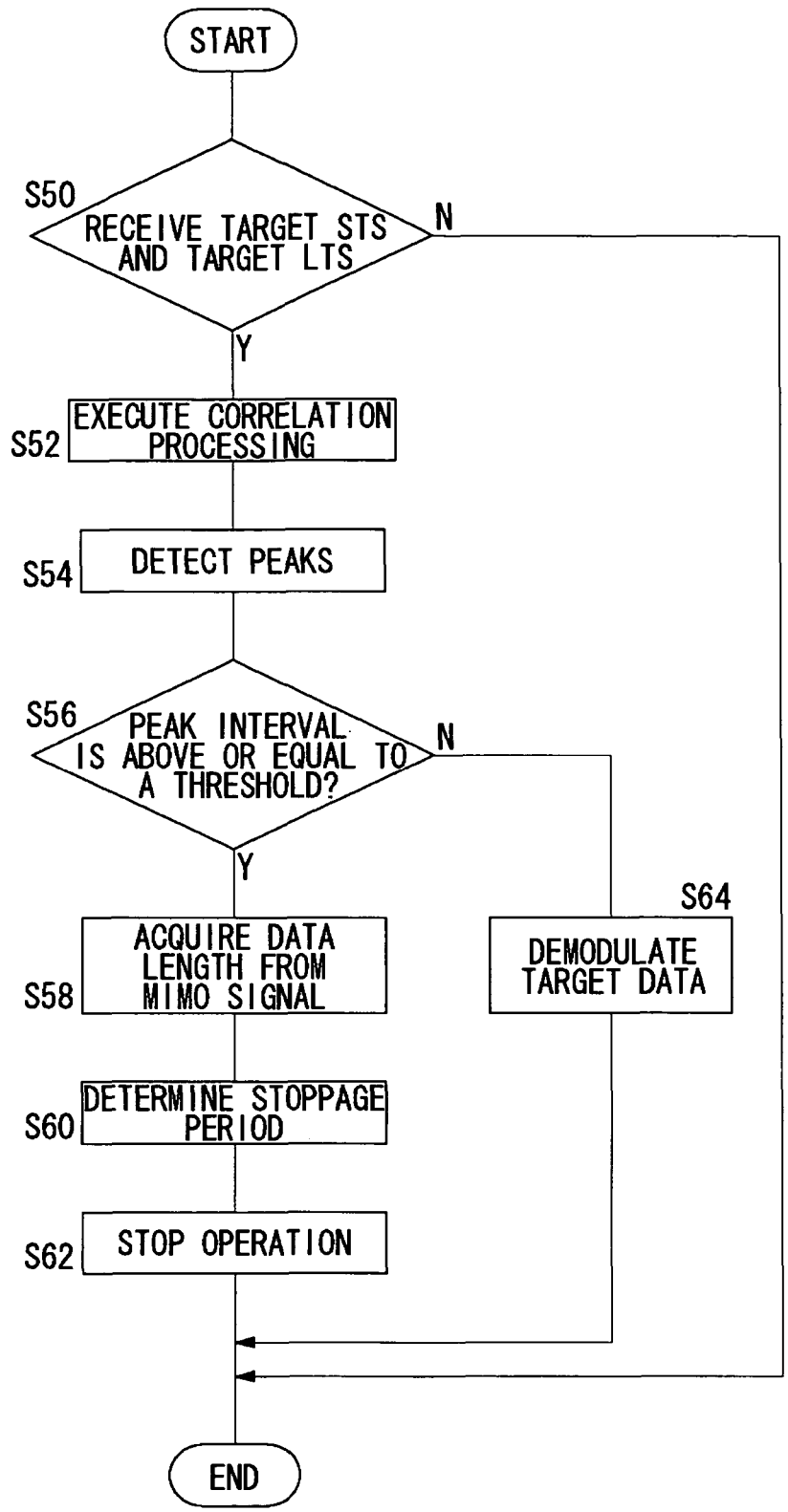
FIG. 12 is a flowchart showing a procedure of receiving operation by a target receiving apparatus shown in FIG. 11.

An operation of the target receiving apparatus structured as above will now be described. FIG. 12 is a flowchart showing a procedure of receiving operation by a target receiving apparatus 54. When the target receiving apparatus 54 receives a target STS and a target LTS (Y of S50), the correlation processing unit 90 carries out correlation processing (S52). The peak detector 94 detects at least two peaks (S54). If the interval of peaks is greater than or equal to a threshold value (Y of S56), the instruction unit 74 acquire the data length from the MIMO signal (S58). Then a stoppage period is determined from the acquired data length (S60), and the instruction unit 74 stops the operation of the baseband processing unit 62 (S62). If, on the other hand, the interval of peaks is not greater than or equal to the threshold value (N of S56), the demodulation unit 70 demodulates the target data (S64). If the target receiving apparatus 54 does not receive the target STS and the target LTS (N of S50). The processing will be terminated.

According to the second embodiment, the relation among a plurality of target STSs or a plurality of target LTSs in the MIMO system differs from the relation in a plurality of signal-wave components contained in the received target STSs and/or target LTSs in the target system, so that the receiving apparatus can detect burst signals in the MIMO system, based on the relation in a plurality of signal-wave components contained in the received signals. Since the operation of receiving is stopped when detected, the increase in power consumption can be suppressed. Since inspecting the header portion of a burst signal can decide on whether it is the burst signal in the MIMO system or not, the operation can be stopped in a remaining part of the burst signal. Thus the effect of reducing the power consumed will be significant. Since the target STSs and so forth transmitted from a plurality of antennas are such that their signal timings are mutually shifted, the correlation among signals transmitted from a plurality of transmitting antennas can be made small. Furthermore, the burst signal in a MIMO system can be detected based on the correlation processing.

Third Embodiment

Similarly to the first and second embodiments, a third embodiment of the present invention relates to a receiving apparatus that receives a burst signal from a transmitting apparatus corresponding to a target system and a transmitting apparatus corresponding to a MIMO system and keeps receiving the burst signal when the burst signal corresponds to the target system and stops receiving the burst signal when the burst signal corresponds to the MIMO system. The receiving apparatus utilizes the phase of pilot signals to determine whether the received burst signal corresponds to the target system or the MIMO system. The pilot signals are assigned to predetermined subcarriers of a plurality of subcarriers used by the target system.

Pilot signals are known signals, which are referred to when a receiving apparatus estimates a radio channel. Even in a MIMO system; pilot signals are assigned to subcarriers which correspond to the same frequencies as those of the subcarriers to which the pilot signals are assigned in the target system (hereinbelow, pilot signals in a target system will be referred to as "target pilot signals", and pilot signals in a MIMO system as "MIMO pilot signals".) The target pilot signals and the MIMO pilot signals are so defined as to have the same signal point constellation. However, the signal points of a target pilot signal and those of a MIMO pilot signal corresponding to the same frequency are so defined as to have different phases, such as inverted phases. The receiving apparatus extracts pilot signals from a received burst signal and determines whether the received burst signal corresponds to the target system or the MIMO system, based on the phase of the extracted pilot signals. That is, a decision is made using the phase of the pilot signals.

The structure of a target receiving apparatus 54 according to the third embodiment is of the same type as that shown in FIG. 6. The judgment unit 72 of the third embodiment, similarly to that of the first embodiment, determines whether target data is assigned or a MIMO signal is assigned in a position posterior to the target signal. In the third embodiment, however, the relationship between the signal point constellation of the target data and the signal point constellation of the MIMO signal is different from that of the first embodiment. A signal that is inputted to the target receiving apparatus 54 has a format as described below.

As shown in FIG. 1, the target data and the MIMO signal are so defined as to use a plurality of subcarriers. 53 subcarriers, namely, subcarrier numbers "−26" to "26", are used. Of a plurality of subcarriers used for the target data and a plurality of subcarriers used for the MIMO signal, pilot signals are allotted to the mutually corresponding subcarriers thereof. In the standard of IEEE802.11a, pilot signals are assigned to the subcarrier numbers "−21", "−7", "7" and "21". In other words, a plurality of pilot signals are used.

The signal points in a target pilot signal and the signal points in a MIMO pilot signal have the same signal point constellation. The same signal point constellation, as shown in FIG. 7B, is so defined that the in-phase component is "1" or "−1" while maintaining being compatible with BPSK. However, the signal points in a target pilot signal and those in a MIMO pilot signal are so defined as to have mutually different phases in the same subcarriers. For example, for the subcarrier number "−21", the target pilot signal has the value of "1" whereas the MIMO pilot signal has the value of "−1".

In terms of the phases of FIG. 7B, the target pilot signal has the phase value of "0" whereas the MIMO pilot signal has the phase value of "π".

In other words, there is an inverted relationship between the phase of the target pilot signal and that of the MIMO pilot signal corresponding to the same subcarrier. Arranged in order from subcarrier number "−26" to subcarrier number "26", the target pilot signals have the values as shown in Equation (1) below. Here, "0" represents the absence of assignment of a pilot signal.

$$P_{-26,26} = \{0,0,0,0,0,1,0,0,0,0,0,0,0,0,0,0,0,0,0,1,0,0,0,0,\\ 0,0,0,0,0,0,0,0,1,0,0,0,0,0,0,0,0,0,0,0,0,-1,0,0,\\ 0,0,0\} \quad (1)$$

Similarly, on the other hand, the MIMO pilot signals have the values as shown in Equation (2) below.

$$P'_{-26,26} = \{0,0,0,0,0,-1,0,0,0,0,0,0,0,0,0,0,0,0,0,-1,0,0,\\ 0,0,0,0,0,0,0,0,0,0,-1,0,0,0,0,0,0,0,0,0,0,0,0,1,\\ 0,0,0,0,0\} \quad (2)$$

Figure 13:
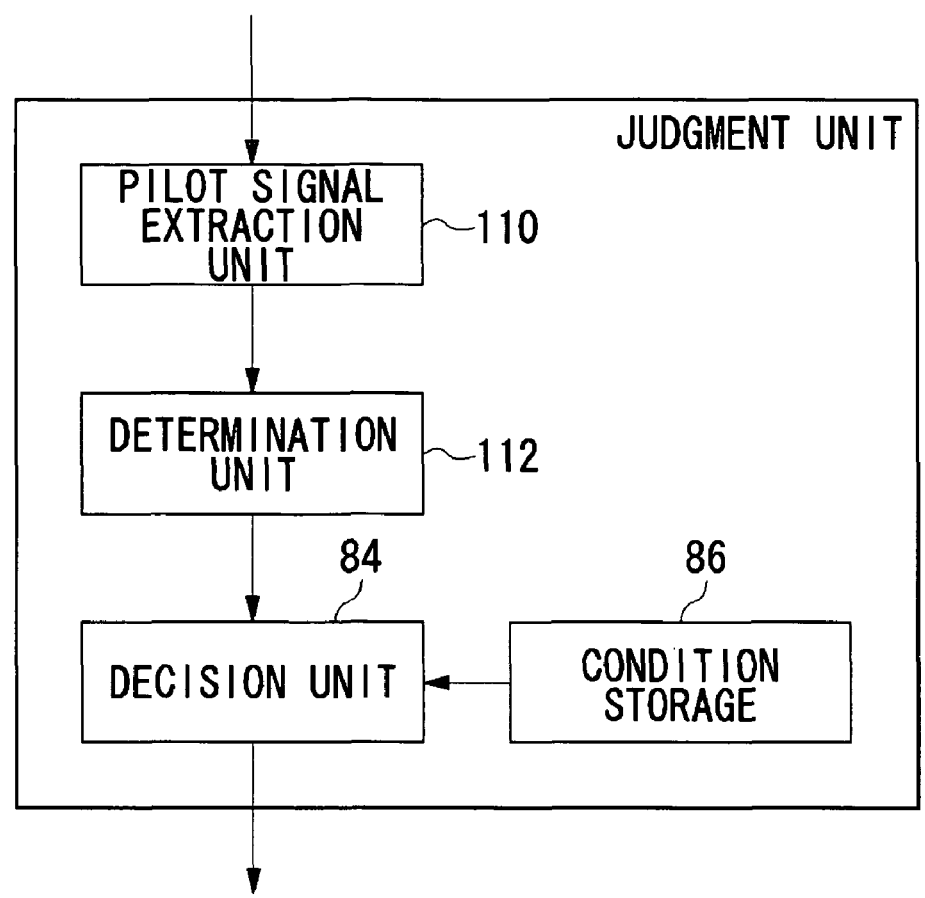
FIG. 13 illustrates a structure of a judgment unit according to a third embodiment of the present invention.

FIG. 13 illustrates a structure of a judgment unit 72 according to the third embodiment. The judgment unit 72 includes a pilot signal extraction unit 110, a determination unit 112, a decision unit 84 and a condition storage 86.

The pilot signal extraction unit 110 receives and inputs demodulated signals from a demodulation unit 70. The demodulated signals are inputted to the pilot signal extraction unit 110 in the order of subcarrier numbers in units of FFT points. That is, a signal corresponding to subcarrier number "−26" is first inputted and finally a signal corresponding to subcarrier number "26" is inputted. Following this, a signal corresponding to subcarrier number "−26" in the next OFDM symbol is inputted. The pilot signal extraction unit 110 extracts pilot signals from these inputted signals. In other words, signals corresponding to subcarrier numbers "−21", "−7", "7" and "21" are extracted.

The determination unit 112 determines the identity of pilot signals extracted by the pilot signal extraction unit 110. The extracted pilot signals are primarily in possession of signal points as shown in FIG. 7B. Due to influences present in the radio channel, the extracted pilot signals are usually deviant from the signal points as shown in FIG. 7B. The deviation from the signal points, however, is one somewhat reduced by the demodulation performed by the demodulation unit 70. The determination unit 112, which defines the orthogonal axes as threshold values, determines an extracted pilot signal to be "1" if it lies in the first or the fourth quadrant. The determination unit 112 determines an extracted pilot signal to be "−1" if it lies in the second or the third quadrant. Ideally speaking, therefore, if the extracted pilot signals are target pilot signals, the pilot signals are determined to be "1", "1", "1" and "−1" in the order of subcarrier numbers.

The condition storage 86 holds values for MIMO pilot signals as reference for the pilot signals determined by the determination unit 112. That is, the condition storage 86 holds the values of "−1", "−1", "−1" and "1" in the order of subcarrier numbers.

The decision unit 84 compares the pilot signals determined by the determination unit 112 with the conditions held in the condition storage 86 and decides whether or not the pilot signals determined by the determination unit 112 are MIMO pilot signals. In other words, the decision unit 84 decides whether the signal point constellation of the pilot signals determined by the determination unit 112 corresponds to the signal point constellation of the MIMO pilot signals or not. For example, if the values of the pilot signals determined by the determination unit 112 are "−1", "−1", "−1" and "1", then the decision unit 84 decides that the pilot signals determined by the determination unit 112 are the MIMO pilot signals.

If the values of the pilot signals determined by the determination unit 112 are "1", "1", "1" and "−1", the decision unit 84 decides that the pilot signals determined by the determination unit 112 are not the MIMO pilot signals. On the other hand, where only part of the four signals are in agreement with the conditions, then the decision unit 84 may make a decision according to the number of signals in agreement. For example, if three of the four signals are in agreement, the decision unit 84 will decide that the pilot signals determined by the determination unit 112 are the MIMO pilot signals. Moreover, the decision unit 84 can make the above decision, using pilot signals in a plurality of OFDM symbols.

Figure 14:
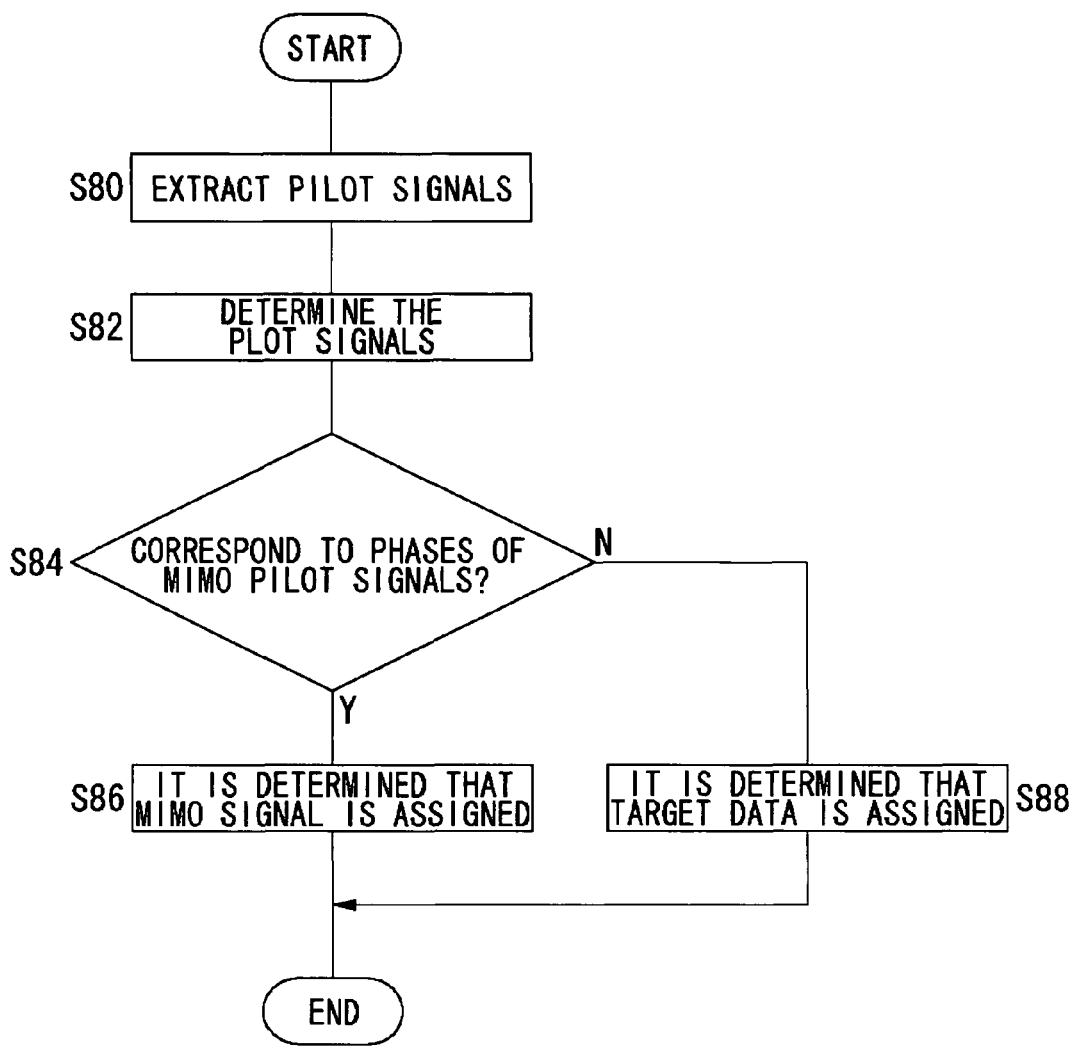
FIG. 14 is a flowchart showing a judgment procedure by a judgment unit shown in FIG. 13.

FIG. 14 is a flowchart showing a judgment procedure at a judgment unit 72. This flowchart corresponds to Step 12 and Step 14 in FIG. 9. The pilot signal extraction unit 110 extracts pilot signals (S80). The determination unit 112 examines and determines the pilot signals (S82). If the pilot signals thus determined correspond to the phases of the MIMO pilot signals (Y of S84), the decision unit 84 decides that the MIMO signal is assigned (S86). On the other hand, if the pilot signals thus determined do not correspond to the phases of the MIMO pilot signals (N of S84), the decision unit 84 decides that target data is assigned (S88).

A modification according to the third embodiment as described above is now explained. This modification makes use of signal point constellations in subcarriers other than the pilot signals, among a plurality of subcarriers. Similarly to the arrangement already described, the target data and the MIMO signals are both so defined as to use a plurality of subcarriers, and, in addition, the pilot signals are assigned to the mutually corresponding subcarriers of the plurality of subcarriers used for the target data and the plurality of subcarriers used for the MIMO signals.

In this modification, however, the signal points in the subcarriers other than pilot signals in the target data (hereinafter referred to as "target carriers") and the signal points in the subcarriers other than pilot signals in the MIMO signals (hereinafter referred to as "MIMO carriers") are so defined as to have different constellations. Accordingly, the target carriers and the MIMO carriers are equivalent to subcarriers other than the subcarriers numbered "−21", "−7", "7" and "21". Also, the signal point constellation of the target carriers corresponds to FIG. 7B, whereas that of the MIMO carriers corresponds to FIG. 7A. That is, the signal point constellation of the target carriers and that of the MIMO carriers have a mutually orthogonal relationship.

Figure 15:
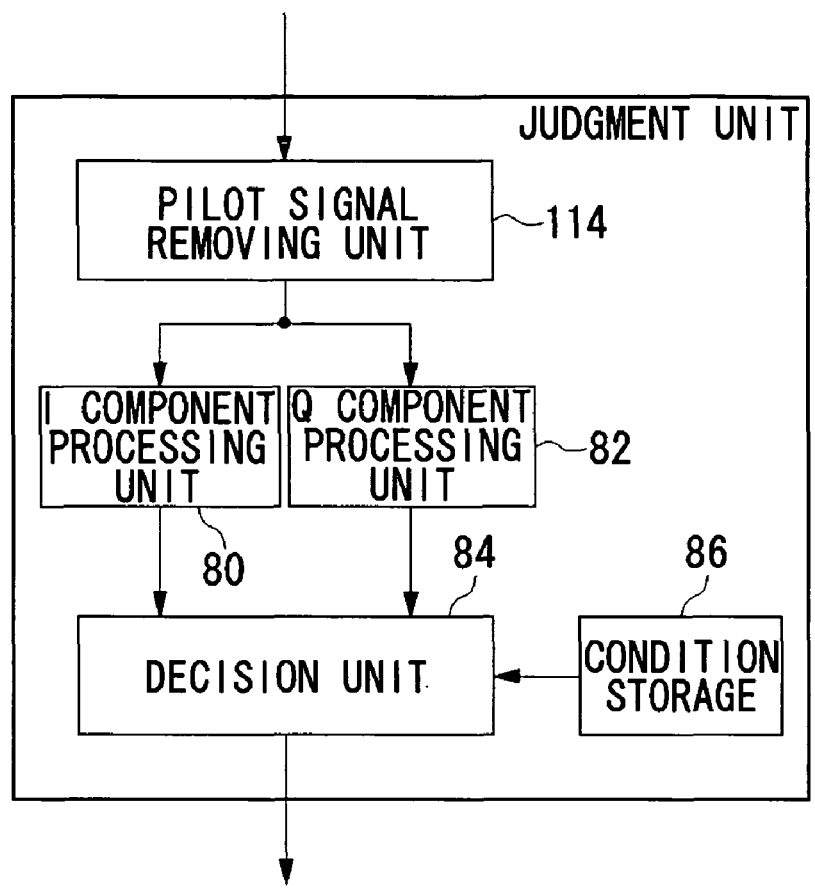
FIG. 15 illustrates a structure of another judgment unit according to the third embodiment.

FIG. 15 illustrates a structure of another judgment unit 72 according to the third embodiment. The judgment unit 72 includes a pilot signal removing unit 114, an I-component processing unit 80, a Q-component processing unit 82, a decision unit 84 and a condition storage 86.

The pilot signal removing unit 114 receives and inputs demodulated signals from a demodulation unit 70. The demodulated signals are inputted to the pilot signal removing unit 114 in the order of subcarrier numbers in units of FFT points. That is, a signal corresponding to subcarrier number "−26" is first inputted and finally a signal corresponding to subcarrier number "26" is inputted. Following this, a signal corresponding to subcarrier number "−26" in the next OFDM symbol is inputted. The pilot signal removing unit 114 extracts subcarriers other than pilot signals from the inputted signals. In other words, subcarriers corresponding to those other than subcarrier numbers "−21", "−7", "7" and "21" are extracted.

The I-component processing unit 80, the Q-component processing unit 82 and the decision unit 84 perform the same operations as illustrated in FIG. 8. For carriers other than pilot signals, the decision unit 84 compares the values of in-phase component and the values of quadrature component with their respective conditions stored in the condition storage 86. At this time, the sum may be calculated for each of the values of in-phase component and the values of quadrature component of a plurality of carriers, and the sum of in-phase components and the sum of quadrature components may be compared with their respective conditions stored in the condition storage 86. Also, the decision unit 84 may compare the value of in-phase components with the value of quadrature components and decide that target data is assigned if the value of in-phase components is larger or that MIMO signal is assigned if the value of quadrature components is larger. In other words, the decision unit 84 may make a decision based on relative values. Here, the decision unit 84 decides that MIMO signal is assigned if the signal point constellation in the carriers other than pilot signals in the positions posterior to the target signal corresponds to the signal point constellation in the MIMO carriers. In this modification, therefore, the same processing as described in the third embodiment is performed on the signals corresponding to subcarriers other than pilot signals of a plurality of subcarriers in order to decide whether the MIMO signal is assigned or not.

Another modification of the third embodiment is explained. This modification is equal to a combination of the third embodiment and the modification as described hereinbefore. In a similar manner to the aforementioned, the target data and the MIMO signal are so defined as to use a plurality of subcarriers as shown in FIG. 1. Also, of a plurality of subcarriers used for the target data and a plurality of subcarriers used for the MIMO signal, pilot signals are assigned to the mutually corresponding subcarriers thereof. Further, the signal points in a target pilot signal and the signal points in a MIMO pilot signal have the same signal point constellation and at the same time are so defined as to have mutually different phases in the same subcarriers. Also, the signal point constellation of target carriers and those of the MIMO carriers have a mutually orthogonal relationship.

Figure 16:
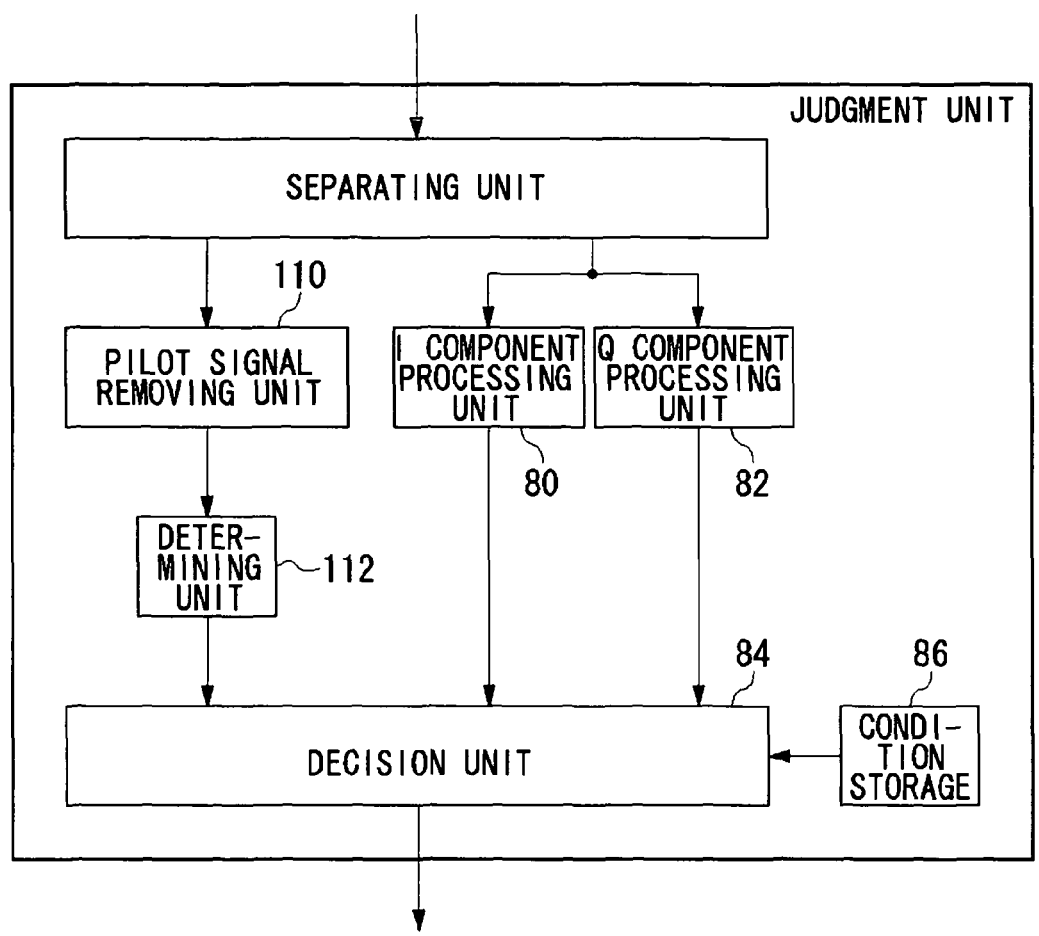
FIG. 16 illustrates a structure of still another judgment unit according to the third embodiment.

FIG. 16 illustrates a structure of still another judgment unit 72 according to the third embodiment. The judgment unit 72 has a structure combining the judgment unit 72 of FIG. 13 and the judgment unit 72 of FIG. 15, and therefore the description thereof is omitted. It is to be noted, however, that the decision unit 84 makes a decision based on the results of a decision formed by the decision unit 84 of FIG. 13 and a decision formed by the decision unit 84 of FIG. 15. It may be arranged such that in the event there is disagreement between the two results of judgment, one of the results of judgment, as predetermined, be used. Also, the decision unit 84 may select to use one of the results of judgment which it assumes to be accurate.

For example, suppose that in the judgment by pilot signals, the MIMO signal is judged to be assigned for all of the four pilot signals and that in the judgment by signals other than pilot signals, the target data is judged to be assigned for 36 of 48 pilot signals. Then it is defined that the accuracy of the former judgment is 100 percent and that of the latter 75 percent. Accordingly, the decision unit 84 follows the former result of judgment. That is, the result of judgment with a higher rate is selected by comparing the rate of the judgment made by use of pilot signals and the rate of the judgment made by use of subcarriers other than pilot signals.

According to the third embodiment of the present invention, the presence or absence of a MIMO signal can be judged by the phase difference between the target pilot signal and the MIMO pilot signal. Since the phases of the target pilot signal and the MIMO pilot signal are in an inverted relationship, the difference between the two can be judged accurately. Moreover, due to the inverted relationship of the phases of the target pilot signal and the MIMO pilot signal, the judgment of the difference between the two can be made and passed at high speed. The constellation of signal points other than pilot signals may be arbitrary, which contributes to raising the freedom of design.

Furthermore, the presence or absence of a MIMO signal can be judged by the difference in signal point constellation between the target carriers and the MIMO carriers. Besides, the judgment can be accurate because the subcarriers other than pilot signals are many. Moreover, the signal-point constellation of pilot signals may be arbitrary, which raises the freedom of design. The signal point constellation of the MIMO pilot signal can be the same as that of the target pilot signal, and therefore the same signal point constellation can be applied and used even when the same pilot signals are defined for both the MIMO system and target system. The presence or absence of a MIMO signal can be judged by using the difference in phase between the target pilot signal and the MIMO pilot signal and the difference in signal point constellation between the target carriers and the MIMO carriers. The judgment can be accurate because it is based on a large number of signals.

The present invention has been described based on the embodiments which are only exemplary. It is therefore understood by those skilled in the art that other various modifications to the combination of each component and process described above are possible and that such modifications are also within the scope of the present invention.

In the first to third embodiments of the present invention, the instruction unit 74 extracts from the MIMO signal the lengths of the first MIMO-data and the like assigned respectively to a plurality of channels associated with a MIMO system. The arrangement is not limited thereto, however. For example, the instruction unit 74 may use a target signal, which is assigned to a position prior to the MIMO signal. That is, the instruction unit 74 may extract from the target signal the length of MIMO-data assigned respectively to a plurality of channels associated with the MIMO system and stop the operation of the baseband processing unit 62 for a period corresponding to the length of extracted MIMO-data. According to the present modifications, however, the lengths of the first MIMO-data and the like may be extracted with a timing earlier than the MIMO signal. This can be done if the period for stopping the baseband processing unit 62 is known.

According to the second embodiment of the present invention, the decision unit 96 decides whether a received signal is a burst signal in a MIMO system or not, based on the relationship between a plurality of signal-wave components contained in the received signal. The arrangement is not limited thereto, however. For example, as with the case in the first embodiment, it may be decided whether the MIMO signal is present or not, based on the relationship between a plurality of signal-wave components. In this case, the judgment unit 72 specifies the relationship between a plurality of signal-wave components contained in the received target STS and/or target LTS and judges whether a MIMO signal is assigned or not, based on the specified relationship and the relationship between the target STS and target LTS in the MIMO system. In this arrangement, the MIMO signal and the MIMO signal+CDD are assigned as shown in FIG. 10. The peak detector 94 derives at least two peaks corresponding to the relationship and decides that a MIMO signal is assigned if the interval between the at least two peaks derived is greater than or equal to a threshold value. According to the present modification, the criteria for deciding whether a MIMO signal is present or not may be a combination of the above-mentioned criteria and the criteria discussed in the first embodiment. This means that the accuracy of judgment on the presence of a MIMO signal can be improved by the use of a plurality of criteria. Which means the arrangement works if it is known whether the MIMO signal is assigned or not.

In the first to third embodiments of the present invention, it has been assumed that the target system is a wireless LAN in compliance with the IEEE802.11a standard. However, the arrangement is not limited thereto but can rely on another communication system, for instance. In such modifications as above, the present invention can be applied to a variety of communication systems. That is, such an arrangement is satisfactory if the target system and the MIMO system have a difference of whether MIMO is applied or not and, in addition, the control signal in the MIMO system has the format of the channel of the target system.

In the first embodiment of the present invention, the judgment unit 72 judges whether a MIMO signal is included in a burst signal or not. However, the arrangement is not limited thereto, but may be such that one bit of the target signal shows a correspondence to the target system or to the MIMO system and the judgment unit 72 detects said bit and decides on the corresponding system from the detected bit. The present modifications simplify the processing. That is, such an arrangement works if the system corresponding to the burst signal is known.

It will be obvious to those skilled in the art that a combination of all or part of the first to third embodiments works effectively. The present modifications produce a combined effect thereof.

While the preferred embodiments of the present invention have been described using specific terms, such description is for illustrative purposes only, and it is to be understood that changes and variations may be made without departing from the spirit or scope of the appended claims.

What is claimed is:

1. A transmitting apparatus for transmitting an OFDM signal, comprising:
a generator operative to generate a burst signal having a first burst format where a first Non-MIMO training signal, a first Non-MIMO signal, a MIMO signal, a MIMO training signal, and first data are arranged in the stated order; and
a transmitter operative to transmit the burst signal generated by the generator, wherein
a subcarrier carrying a first pilot signal included by frequency-division multiplexing in the first data in the first burst format of the burst signal generated by the generator is the same as a subcarrier carrying a second pilot signal included by frequency-division multiplexing in second data in a second format where a second Non-MIMO training signal, a second Non-MIMO signal, and the second data are arranged in the stated order,
a modulation scheme of the first pilot signal is the same as a modulation scheme of the second pilot signal,
a pattern of the first pilot signal is different from a pattern of the second pilot signal, and
the transmitter transmits the burst signal from a plurality of antennas such that the signal transmitted from a given one antenna is shifted in timing with respect to the signal transmitted from another antenna in a cyclical manner.

2. A transmitting method for transmitting an OFDM signal, comprising:
generating a burst signal having a first burst format where a first Non-MIMO training signal, a first Non-MIMO signal, a MIMO signal, a MIMO training signal, and first data are arranged in the stated order; and
transmitting the burst signal, wherein
a subcarrier carrying a first pilot signal included by frequency-division multiplexing in the first data in the first burst format is the same as a subcarrier carrying a second pilot signal included by frequency-division multiplexing in second data in a second format where a second Non-MIMO training signal, a second Non-MIMO signal, and the second data are arranged in the stated order,
a modulation scheme of the first pilot signal is the same as a modulation scheme of the second pilot signal,
a pattern of the first pilot signal is different from a pattern of the second pilot signal, and
the transmitting transmits the burst signal from a plurality of antennas such that the signal transmitted from a given one antenna is shifted in timing with respect to the signal transmitted from another antenna in a cyclical manner.

* * * * *